United States Patent [19]

Potzler et al.

[11] Patent Number: 4,955,032

[45] Date of Patent: Sep. 4, 1990

[54] METHOD AND APPARATUS FOR MAPPING FRAMES OF AN UPDATABLE ELECTROPHOTOGRAPHIC MEDIUM

[75] Inventors: J. Edward Potzler, Brookfield; Daryl J. Strahan, Wilmette, both of Ill.

[73] Assignee: A. B. Dick Company, Chicago, Ill.

[21] Appl. No.: 185,124

[22] Filed: Apr. 22, 1988

[51] Int. Cl.[5] ........................ G06F 15/20; G03B 27/52

[52] U.S. Cl. .................................. 364/525; 353/27 A; 355/54; 356/444; 364/571.07

[58] Field of Search .................... 364/525, 526, 571.07; 355/41, 54, 64; 356/443, 444; 353/25, 27 R, 27 A

[56] References Cited

U.S. PATENT DOCUMENTS

| | | | |
|---|---|---|---|
| 3,873,213 | 3/1975 | Plumadorf | 356/209 |
| 4,082,442 | 4/1978 | Gross | 355/3 R |
| 4,210,818 | 7/1980 | Green et al. | 250/559 |
| 4,213,040 | 7/1980 | Gokey et al. | 235/476 |
| 4,241,992 | 12/1980 | Flint et al. | 355/41 |
| 4,283,621 | 8/1981 | Pembroke | 355/64 |
| 4,287,564 | 9/1981 | Swift et al. | 364/525 |
| 4,427,292 | 1/1984 | Buchanan | 364/525 |

*Primary Examiner*—Parshotam S. Lall
*Assistant Examiner*—Brian M. Mattson
*Attorney, Agent, or Firm*—Rockey and Rifkin

[57] ABSTRACT

A method and apparatus for electronically mapping an updatable microfiche includes a microprocessor-based analyzer programmed to control and evaluate optical scanning of the imaging frame areas arranged in generally parallel rows and columns. Optical photosensors are used to detect the presence of a frame mark within an expected region of an imaged area. An electronic data mask retrievably stored in a mask table memory array is used to screen the output data from the sensors. The mask table is derived from relative sensor position data collected during a scanning operation on a calibrated microfiche. A look-up table memory array is used to store the results of an evaluation scan by storing which frames are imaged and which are available for imaging.

17 Claims, 10 Drawing Sheets

PRIMARY LOAD FUNCTION

DATA MASK TABLE

SENSOR BITS: 15 14 13 12 11 10 9 8 7 6 5 4 3 2 1 0

- STEP 129 — WORD 49
- STEP 128 — WORD 48
- STEP 127 — WORD 47
- STEP 126 — WORD 46
- STEP 125 — WORD 45
- ⋮
- STEP 104 — WORD 24
- ⋮
- STEP 85 — WORD 5
- STEP 84 — WORD 4
- STEP 83 — WORD 3
- STEP 82 — WORD 2
- STEP 81 — WORD 1
- STEP 80 — WORD 0

TEST BITS: S14, S13, S12, S11, S10, ... S4, S3, S2, S1

DATA MASK TABLE
(EVALUATE MODE)

FIG. 10

LOOK UP TABLE MATX (ROW, BN) 150

FRAME COLUMN BITS

| | | TEST BITS | | S14 | S13 | S12 | S11 | S10 | S9 | S8 | S7 | S6 | S5 | S4 | S3 | S2 | S1 |
|---|---|---|---|---|---|---|---|---|---|---|---|---|---|---|---|---|---|
| ROW 8 | W7 | 0 | 0 | 0 | 0 | 0 | 0 | 0 | 0 | 0 | 0 | 1 | 1 | 1 | 1 | 1 | 0 |
| ROW 7 | W6 | 0 | 0 | 0 | 0 | 1 | 1 | 1 | 0 | 0 | 0 | 0 | 0 | 0 | 0 | 0 | 0 |
| ROW 6 | W5 | 0 | 0 | 0 | 0 | 0 | 1 | 0 | 0 | 1 | 1 | 1 | 0 | 0 | 0 | 0 | 0 |
| ROW 5 | W4 | 0 | 0 | 0 | 0 | 0 | 1 | 0 | 0 | 1 | 1 | 1 | 0 | 0 | 0 | 0 | 0 |
| ROW 4 | W3 | 0 | 0 | 0 | 0 | 0 | 0 | 0 | 0 | 0 | 0 | 0 | 0 | 0 | 0 | 0 | 0 |
| ROW 3 | W2 | 0 | 0 | 0 | 0 | 0 | 0 | 0 | 0 | 0 | 0 | 0 | 0 | 0 | 0 | 0 | 0 |
| ROW 2 | W1 | 0 | 0 | 0 | 0 | 0 | 0 | 0 | 0 | 0 | 0 | 0 | 0 | 1 | 1 | 1 | 0 |
| ROW 1 | W0 | 0 | 0 | 0 | 0 | 0 | 0 | 0 | 0 | 0 | 0 | 0 | 0 | 0 | 0 | 0 | 0 |

METHOD AND APPARATUS FOR MAPPING FRAMES OF AN UPDATABLE ELECTROPHOTOGRAPHIC MEDIUM

BACKGROUND OF THE INVENTION

The invention relates generally to information and document archive systems which utilize electrophotoqraphic media such as "microfiche" cards to store miniaturized copies of documents, data and the like. More particularly, the invention relates to methods and apparatus useful with add on or updatable microfiche imaging systems to electronically determine which imaging areas or frames on a microfiche have been developed or otherwise are available for imaging.

Though the use of microfiche document storage has been well known and widespread for many years now, prior attempts to reliably and economically determine how much total useful area on a microfiche is available for further imaging have been largely unsuccessful. For example, it is known generally that imaged areas on a microfiche can be electronically detected by optical sensors that emit a light beam and detect the amount of light reflected or passed through the microfiche. Imaged areas, for example alphanumeric images, may be developed on the microfiche by us of darkened particles or toner which change the light or reflectivity characteristics of the electrophotographic medium.

While these techniques for detecting imaged areas on a microfiche have been previously used, they provided little or no assurance that valid frame marks were being detected. That is, optical sensors are very sensitive to dust and dirt contamination resulting in false readings by optical sensors. Furthermore, prior techniques required strict tolerances on the sensitivity of the optical sensors, as well as the physical positioning or alignment of the sensors with respect to the microfiche. Such strict tolerances substantially increase the cost of design and maintenance of the sensor apparatus. Even the slightest misalignment or skewing of the sensors can cause false readings and erroneous position indications.

Prior apparatus also did not provide an overall mapping technique so that a partially developed or updatable microfiche could be analyzed electronically for available imaging areas. Prior analysis techniques required either visual determination of available imaging areas, or time consuming frame by frame or sequential scanning to locate an available frame for the next image. Such sequential scanning is time consuming and thus costly; for all practical purposes the use of frame by frame scanning makes random or non-sequential imaging of a microfiche prohibitive.

Accordingly, the need has existed for a low-cost and efficient apparatus and method for electronically analyzing an updatable microfiche.

SUMMARY OF THE INVENTION

The present invention provides improved methods and apparatus for electronically analyzing an updatable or non-sequentially imaged electrophotographic medium such as a microfiche. The microfiche is of the type having a plurality of discrete imaging areas or frames, preferably arranged in an array of generally parallel rows and columns. When an imaging area is developed, a frame mark is placed within the frame. A frame mark may also be a border around the frame. Each frame mark changes the light transmissivity or reflectivity of the microfiche photosensitive layer. According to one aspect of the invention, a microprocessor-controlled signal processing and analyzing apparatus for electronically analyzing an updatable microfiche includes optical sensors for scanning the microfiche. The optical sensors are particularly adapted to optically detect the presence of a frame mark within an expected region or predetermined portion of an imaging area.

An individual sensor is preferably provided for each column of frames, and each row of frames is sequentially scanned by moving the microfiche in a plane parallel to the plane of the frame columns in close proximity to the sensors. The sensors produce electrical data output signals which correspond to the presence or absence of a frame mark. For each row scanned, data sampling and storage means are provided, under the control of software, to process the sensor signals and accumulate data from each sensor only from scanning predetermined areas called a physical window. The physical window for each sensor is position dependent with respect to the microfiche and may be the same as or different from any of the other sensors physical windows. The relative position characteristics of the physical window are calculated from data collected during a calibration sequence on a "test" microfiche and then retrievably stored in a first electronic memory region, called a mask table for subsequent use in evaluating updatable microfiche.

The mask table data is used as an electronic mask or data screen overlay which only permits data from the sensors taken within the sensor's physical window to be sampled and processed. All other data from the sensor is in effect screened out or masked to minimize false detections.

Another aspect of the microfiche analyzing apparatus according to the present invention is the provision of a second dedicated portion of electronic memory for use during evaluation of a microfiche as a frame map or look-up table. After the evaluation output data is collected and stored for each sensor, unique signal processing techniques under control of system software determines the location of all imaged areas or frames on an updatable microfiche. Within the look-up table memory array there is a unique memory location that corresponds to each imaging area or frame on the microfiche. Once the microprocessor based controller determines that a particular frame is imaged, it stores an appropriate data value in the corresponding look-up table memory location for that frame. The computer thereafter can access and update the map whenever that particular microfiche is updated by adding more frames or imaged areas thereto. The map immediately informs the microprocessor, or the user via a visual display console, which imaging areas are available on the microfiche and thus can also be used to prevent double exposure of a frame.

During the calibration sequence of the present invention the microfiche analyzing apparatus also determines the sensitivity level of each sensor and the average sensitivity of all the sensors together. These sensitivity levels are used to determine, from the sampled sensor data stored after each row scan, whether a valid frame mark was detected.

The present invention further contemplates an improved method of detecting the presence of predetermined frame marks on a partially or fully imaged microfiche of the type described above. This is generally referred to as an evaluation mode or process. One aspect of this method utilizes a plurality of optical sensors for scanning the microfiche. Each sensor provides electrical data output indicative of the presence or absence of frame marks. Portions of the output data for each sensor are stored in memory during each row scan and analyzed by a microprocessor-based controller by comparing the row scan data with predetermined sensitivity levels to verify the data is valid. An electronic data masking step selectively screens or masks the sensor output data according to calibrated position data derived from a calibration microfiche. Upon determining which frames on the microfiche have been imaged, a frame map of the microfiche is created or updated in an addressable electronic memory to store in memory data which represents and identifies frame areas that are available for developing or that are imaged.

An important aspect of the methods and apparatus used with the present invention is the dynamic calibration sequence that generates the relative position data for each sensor, stored in the mask table, and which determines the sensitivity of each sensor. Further, the electronic mask or data overlay provides a method and means by which only data received from each sensor taken within the sensor's physical window will be stored in memory. This calibrated electronic data mask is based on the relative physical location of each sensor with respect to its corresponding microfiche imaging areas and frame marks.

The calibration is dynamic in that it automatically compensates for machine to machine variations and misalignments between the sensors and the microfiche, or variations in sensor sensitivity. The calibration may be based on a "known good" microfiche or a microfiche imaged by an overall imaging apparatus operating in combination with the apparatus and/or methods of the present invention.

Thus, the apparatus and methods of the present invention provide an efficient and economical way to electronically analyze an updatable microfiche. The invention is much less sensitive to contamination and stray markings on the microfiche, as well as being less dependent on tight tolerances on the characteristics and relative alignment of the optical sensors. Therefore, less expensive sensors may be used and assembly and maintenance of the apparatus is simplified. The dynamic calibration techniques automatically compensate for variations in sensor sensitivity and relative position with respect to the microfiche under evaluation.

Other important aspects and advantages of the present invention will be apparent from the more detailed description of the preferred embodiments in view of the accompanying drawings.

BRIEF DESCRIPTION OF THE DRAWINGS

FIG. 10 is a representation of an electronic memory array used as a look up table or map of the imaged and unimaged frames on an updatable microfiche after the microfiche has been scanned.

DESCRIPTION OF THE PREFERRED EMBODIMENT

Figure 1:
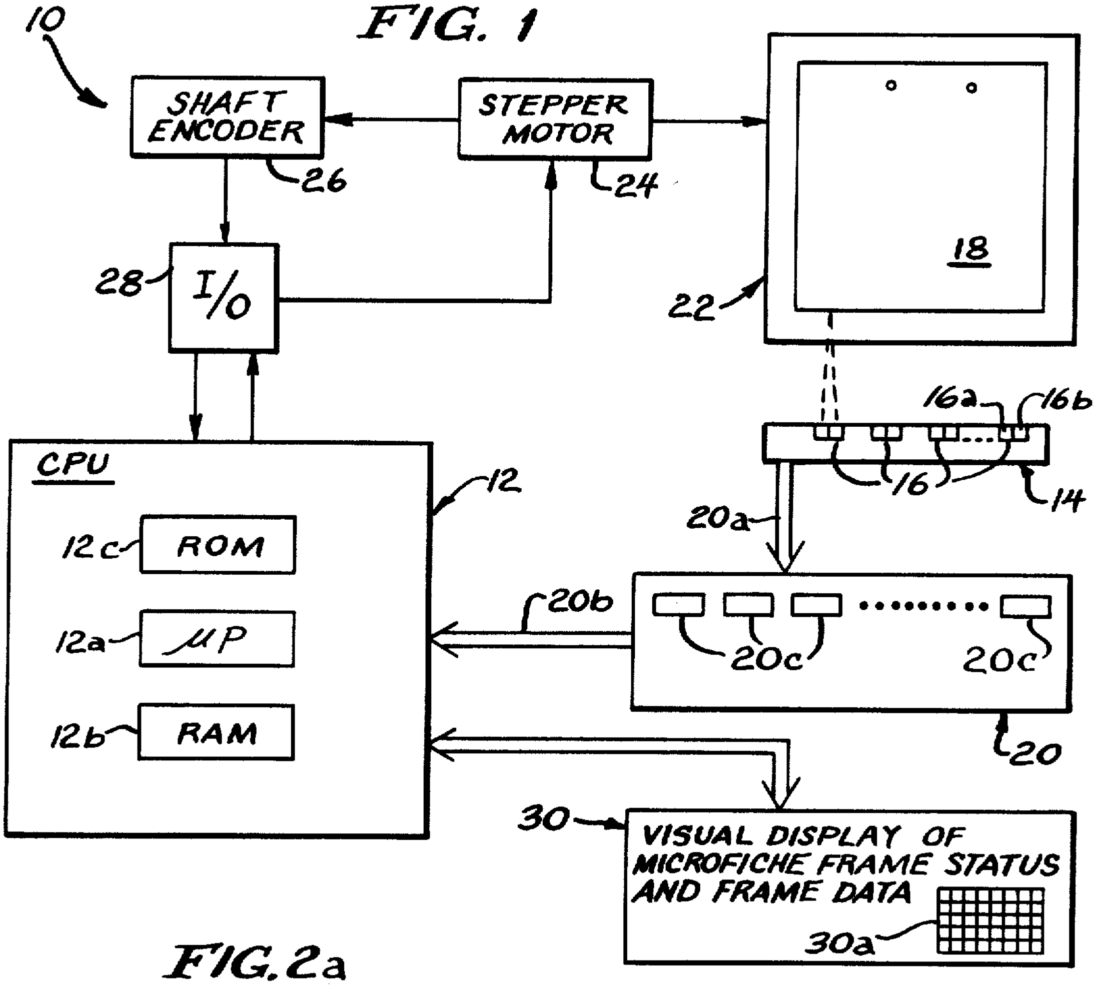
FIG. 1 is a simplified functional block diagram and partial schematic of an apparatus for electronically analyzing an updatable electrophotographic medium such as a microfiche.

With reference to FIG. 1, a simplified functional block diagram and partial schematic of an apparatus according to the present invention for electronically analyzing an electrophotographic medium is generally indicated by the numeral 10. The analyzer 10 includes a central processing unit (CPU) controller 12 mounted on a conventional printed circuit board or assembly that contains a microprocessor 12*a* and related support hardware. The CPU controller 12 preferably includes one or more random access memory (RAM) devices 12*b* used by the microprocessor 12*a* for data collection and storage in a known manner. The size and number of RAM devices, of course, will depend on the total memory needed in addition to on-chip microprocessor memory. As those skilled in the art will appreciate, memory requirements are determined principally by the microprocessor specifications, software design and data storage needs. The CPU controller 12 may also utilize one or more read-only memory devices (ROM) 12*c* which, as is typical in most microprocessor based controllers, are used to permanently store the system operating software and instructions for the microprocessor 12*a*. The controller 12 also includes other peripheral support hardware such as data latches and logic control gates (not shown) as would typically be used with any microprocessor based controller. As those skilled in the art will appreciate, the actual hardware requirements will be determined, of course, by the particular microprocessor 12*a* selected for use with the analyzer 10.

The operating software and instructions are designed in accordance with the microprocessor manufacturer's requirements and instructions. Such instructions are readily available from the manufacturer and need not be further described herein to appreciate and practice the present invention. Certain aspects of the software controlled processes, however, are an important part of the inventions described and claimed herein, and these aspects will be further discussed in detail below with the aid of software flowcharts. The actual implementation of the software processes described herein, however, may be accomplished with computer programs generated in accordance with the particular hardware requirements and specifications.

Still referring to FIG. 1, the analyzer 10 includes a sensor assembly 14 which preferably has a plurality of optical sensors 16 mounted in a single row thereon The optical sensors 16 may be conventional photodetectors. As will be explained hereafter, the sensors 16 are used to optically scan an electrophotographic medium 18 and produce electrical signals that indicate the relative reflectivity of the medium at certain locations thereon.

The sensor assembly 14 interfaces with the CPU controller 12 through a scanner board 20. A multiconductor bus 20*a* may be used to link the sensor assembly 14 with the scanner board 20, and another bus 20*b* connects the scanner board 20 with the CPU controller 12. The scanner board 20 includes signal processing circuitry such as conventional voltage comparators 20*c* to convert each of the analog sensor 16 electrical data output signals into binary data electrical signals compatible with the microprocessor circuitry requirements. Again, the specific hardware design requirements will be determined by the particular microprocessor controller selected. At this point, it should be noted that all the hardware needed to practice the inventions disclosed herein is readily available as off-the shelf items from any number of electronics distributors.

The electrophotographic medium 18 is preferably attached to or mounted on a slideable platen 22. The platen 22 is mounted on a movable carriage (not shown) so that the platen can be moved in a plane parallel to the plane of a set of frame columns on the electrophotographic medium 18 that will be described shortly. The platen 22 can be moved in at least the X and Y directions, however, as will be explained further, only one direction of relative movement between the medium 18 and the sensors 16 is necessary to practice the present invention.

Movement of the platen 22 is effectuated by a conventional stepper motor 24 operably connected to the platen 22 by a conventional worm gear (not shown). The CPU controller 12 regulates and controls operation of the stepper motor 24 so that precise positioning of the platen 22 with respect to the sensor assembly 14 is accomplished. A shaft encoder 26 converts mechanical shaft rotation of the stepper motor 24 into electrical data received and analyzed by the CPU controller 12. The CPU controller 12 can determine from this data the exact position of the platen 22 in terms of discrete motor steps from a reference point at any given time. An Input/Output (I/0) assembly 28 provides the electrical and software interface between the shaft encoder 26, stepper motor 24 and the CPU controller 12 as is well known to those skilled in the art.

A display unit 30 is provided so that a visual read-out of the analyzer 10 data can be displayed. For example, the display 30 may show, by use of an LED array 30*a*, which imaging areas or frames of the electrophotographic medium 18 have been developed, which ones are available for imaging, as well as other information principally used during a calibration sequence which will be described hereinbelow. The display unit 30, of course, contains the appropriate means for visually observing the data compiled by the CPU 12, such as LED lights, LCD devices for alphanumeric displays, and interface circuitry to permit communication with the CPU controller 12 via a multiconductor bus 30*b*.

The particular configuration of the hardware shown in FIG. 1 is merely for convenience of explanation and should not be interpreted as any limitation of the invention described herein. Those skilled in the art will readily appreciate that all the electronic components can be mounted on a single circuit board or arranged in any other convenient manner. Similarly, the analyzer 10 preferably is included as a subassembly or add-on assembly of an overall imaging system used to develop images on the electrophotographic medium 18, such as a system shown and described in U.S. Pat. No. 4,082,442 issued to Gross and assigned to the assignee of the present invention, the disclosure of which is fully incorporated herein by reference. The controller 12 can thus be used not only for analyzing an electrophotographic medium but also for controlling the overall imaging system and processes. Such a combined arrangement of the imaging system with the present invention is particularly convenient for use with updatable electrophotographic media.

Figure 2A:
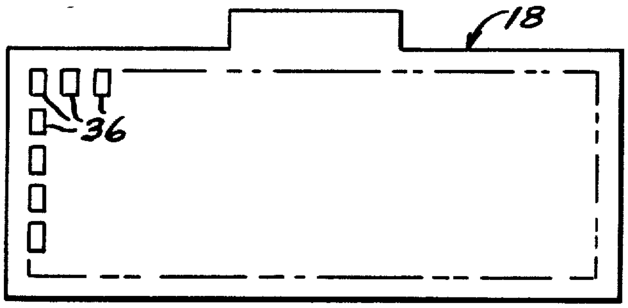
FIGS. 2*a*–2*c* are schematic drawings of representative microfiche elements and enlarged views thereof.
Figure 2B:
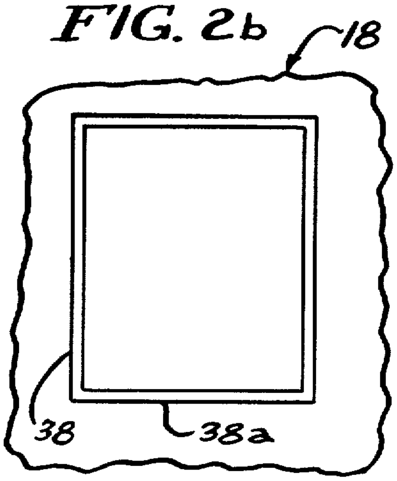

With reference now to FIGS. 2*a* and 2*b*, the electrophotographic medium 18 is preferably made from a thin sheet of aluminized mylar. For example, the medium 18 may be a conventional microfiche made of clear or translucent materials and having a photoconductive layer (not shown) for producing electrostatic latent images thereon. Electrophotographic apparatus and processes for developing images on a microfiche are described in U.S. Pat. No. 3,873,213 issued to Plumadorf which disclosure is fully incorporated herein by reference. The particular system used to develop images, such as data and alphanumeric characters on a microfiche, is not considered a material part of the present invention; however, the apparatus and processes disclosed herein can be easily incorporated into such imaging systems to more fully obtain all the advantages provided by the present invention., as those skilled in the art will readily appreciate.

As such, the present invention is not limited to dark images positively developed on a clear microfiche, but also negative development can be utilized. Further, the particular arrangement of images on the microfiche need not be limited to rows and columns, though such an arrangement is preferred to simplify the scanning procedure and reduce software complexity.

As shown in FIG. 2*a*, the microfiche includes two guide pinholes 32 which are used to accurately align and mount the microfiche on the platen 22 via alignment pins 34 (FIG. 1)

The microfiche 18 includes a plurality of discrete imaging areas or frames 36. As more clearly shown, the enlarged view of a frame in FIG. 2*b*, after an imaging area 36 has been developed, that area may contain a variety of indicia such as alphanumeric figures, data, pictures and so on. The outer boundary of the imaged area 36, which hereinafter will be referred to as a frame, is indicated by a peripheral border 38. The border 38 preferably is used as a frame mark in that it visually sets off the frame area and is an indicia that the particular imaging area has been developed.

As will now be described in greater detail, the present invention provides an improved apparatus and process for detecting the presence of a frame mark so as to prevent double exposure of a frame and to determine which frames are available for an updatable microfiche. While preferably the frame mark 38 is a peripheral border surrounding the frame area 36, it will be readily appreciated from the subsequent explanation herein that only a small portion of the border-type frame mark 38 is actually scanned. Therefore, a frame mark may be any indicia located within an imaged frame, positioned at a predetermined location, and being a predetermined size and shape. The apparatus 10 is calibrated prior to evaluating an "unknown" or partially developed microfiche such that the particular type or shape or size of the frame mark 38 is not critical, so long as the same kind of frame mark is used both for calibration and evaluation.

Figure 2C:
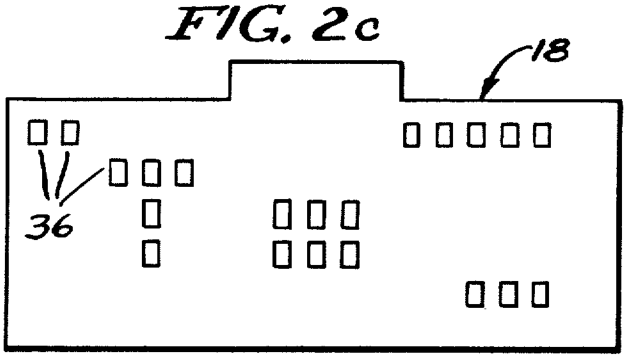

The frames 36 are preferably arranged in an array of rows and columns (FIG. 2*a*). In many instances, however, the frames are non sequentially developed so that the imaged frames may be randomly located within the array on the microfiche, such as shown in FIG. 2*c*. In order to prevent double exposure and to determine which frames 36 are still available, the analyzer 10 scans the entire microfiche 18 in a continuous manner, using the sensors 16 to detect the presence or absence of a frame mark at each frame location 36 on the microfiche 18.

Figure 3:
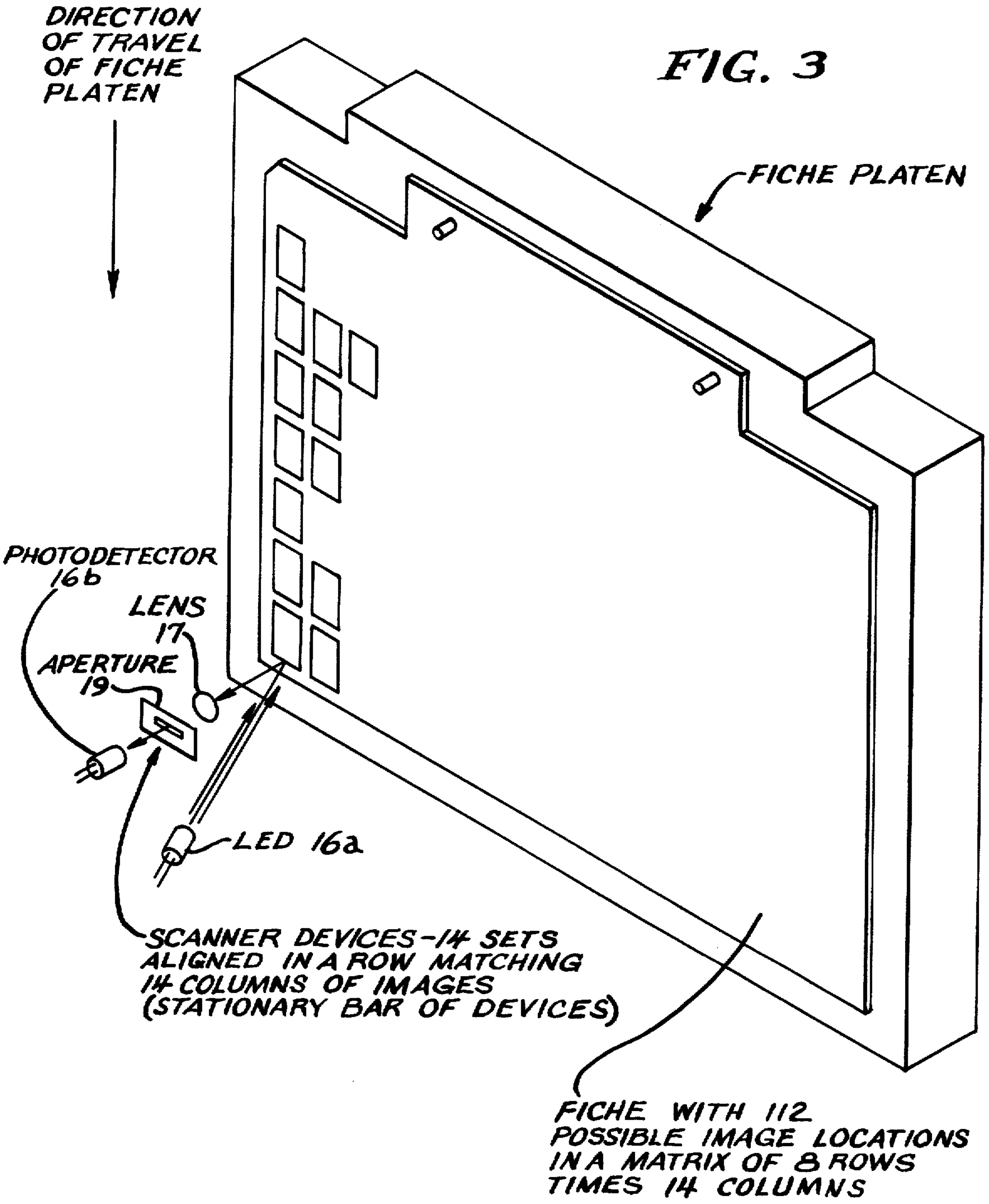
FIG. 3 is a perspective view of a typical microfiche card on a moveable platen in close proximity to a bank of optical detectors in accordance with the present invention.

With reference to FIG. 3, the sensor assembly 14 includes a plurality of sensor elements 16 aligned in a row opposite the platen 22. One sensor element 16 is provided for and centrally aligned with each column of frames 36. The use of individual sensors for each column of frames permits an entire row of frames to be scanned simultaneously. As the platen 22 is moved vertically down (as viewed in FIG. 3) the sensors 16 scan each row of frames 36 sequentially across the entire microfiche 18. The preferred embodiment shown permits an entire microfiche 18 to be scanned with one pass of the platen 22 past the sensors 16. While the use of an array of rows and columns for the frames 36, and a bank or row of sensors 16, one for each column, provide the simplest scanning procedure for the entire microfiche, it will be readily apparent that other frame arrangements and sensor alignments can be used. The only restriction is that the microprocessor controller 12 and software be programmed so as to have predetermined positions on the microfiche where the frame marks are expected to be located.

The scanning system for each column consists of a separate light emitting diode (LED) **16*a* and a photodector 16*b*. Conventional devices such as LED type OTL 302L and photodector type OT410TC, both manufactured by Opto Technology, Inc. are suitable. Alternately, a combination of light emitting diode and photodector in one package could be used. The LED floods the area with light which is reflected back through a lens 17 to the photodector. An aperture member 19** limits the area "seen" by the photodector.

The purpose of the sensors 16 is, of course, to produce electrical signals that vary in response to the amount of reflected light from the microfiche 18. After a latent image is electrostatically developed on a microfiche, the darkened area of the image, caused by heat development of the black toner, has a substantially lower light transmissivity or reflectivity. The darkened area, therefore, reduces the amount of light detected by the sensors.

Each sensor 16 produces an analog data output signal proportional to the light received from or reflected off the microfiche 18. The output signal from each sensor 16 is compared with a reference level by the corresponding comparator **20*c* on the sensor assembly 14. Each comparator 20*c* produces a binary digital output—for example, a "0" may indicate the sensor 16 has detected a dark area or "black", and a "1" indicate the sensor has detected an unimaged area or no "black" spot. The raw data from the sensors 16 and comparators 20*c* alone provides no indication whether valid frame mark data is being outputted. For example, dust, dirt and even fingerprints may sufficiently reduce the amount of light from the microfiche 18** that the sensors indicate a darkened region is present when in fact that is not the case. This problem of false readings is minimized by the present invention a will be explained hereinbelow.

In the preferred embodiment, the platen 22 is a black surface. This permits the sensors 16 to detect the bottom edge **18*a* of the microfiche (FIG. 3). The lowest portion 22*a* of the platen 22 causes the sensors 16 to all produce output data indicating black areas. As the platen 22 is moved down past the sensor assembly 14, one or more of the sensors 16 will detect the bottom edge 18*a* of the microfiche by detecting a substantial increase in the amount of reflected light received by the photodetector 16*b***.

The remaining structure and operation of the microfiche analyzer apparatus 10 can most easily be understood and appreciated by an explanation of the specific processes and methods used therewith in accordance with the present invention.

One of the significant advances of the present invention is that the analyzer 10 can self-compensate for misalignment of the sensors 16 with respect to the microfiche 18 and platen 22, variations in sensitivity of the individual sensors 16, variations in operating speed of the stepper drive motor 24, as well as the presence of contamination such as dust, dirt, fingerprints and so forth on the microfiche 18. This self-compensation is accomplished with dynamic calibration and unique signal processing methods and data analysis techniques controlled by the CPU and related software. These processes will be described with reference primarily to flowcharts depicting CPU 12 operation. Those skilled in the art will readily appreciate that the flowcharts can be easily implemented by software program development in accordance with the microprocessor manufacturer's requirements and specifications. No particular program format or structure is required to practice the invention and can easily be developed by computer programmers skilled in the art.

In addition to determining which frames 36 are imaged and unimaged, the present invention provides an improved method for validating the output data from the optical sensors 16. This involves a calibration sequence during which a sample microfiche having standardized o predetermined frame marks developed thereon is analyzed. By the use of a "known good" microfiche frame mark, the analyzer 10 collects data from the sensors 16 and calculates the sensitivity and relative position data for each sensor. This information is then stored in memory for later use when analyzing a microfiche having an unknown number of imaged frames thereon.

In order to describe and illustrate in detail the methods and apparatus of the present invention, a specific example of an updatable and partially developed microfiche is described herein. Similarly, a specific example of data collected, stored and processed for such a microfiche is also described herein. However, these examples should not be construed as limiting the claimed invention to any particular embodiment or example shown or described.

By way of example, an updatable microfiche 18 (FIG. 3) may have eight rows of frames 36 (labelled ROW 1–ROW 8) arranged in fourteen columns (C1–C14). Since there are fourteen columns, the sensor assembly has fourteen sensors, S1–S14, each one positioned across from its corresponding column. The sensors 16 are positioned approximately in the center of each column. While preferably a black border 38 is used as a frame mark to indicate an area is imaged, other frame mark designs can be used. The only limitation is that as the microfiche 18 is transported by the platen 22 past the sensors 16, the frame marks 38 must be within or define the frame area and traverse the optical window of the sensors, otherwise the sensors 16 will not "see" the frame marks.

Figure 4:
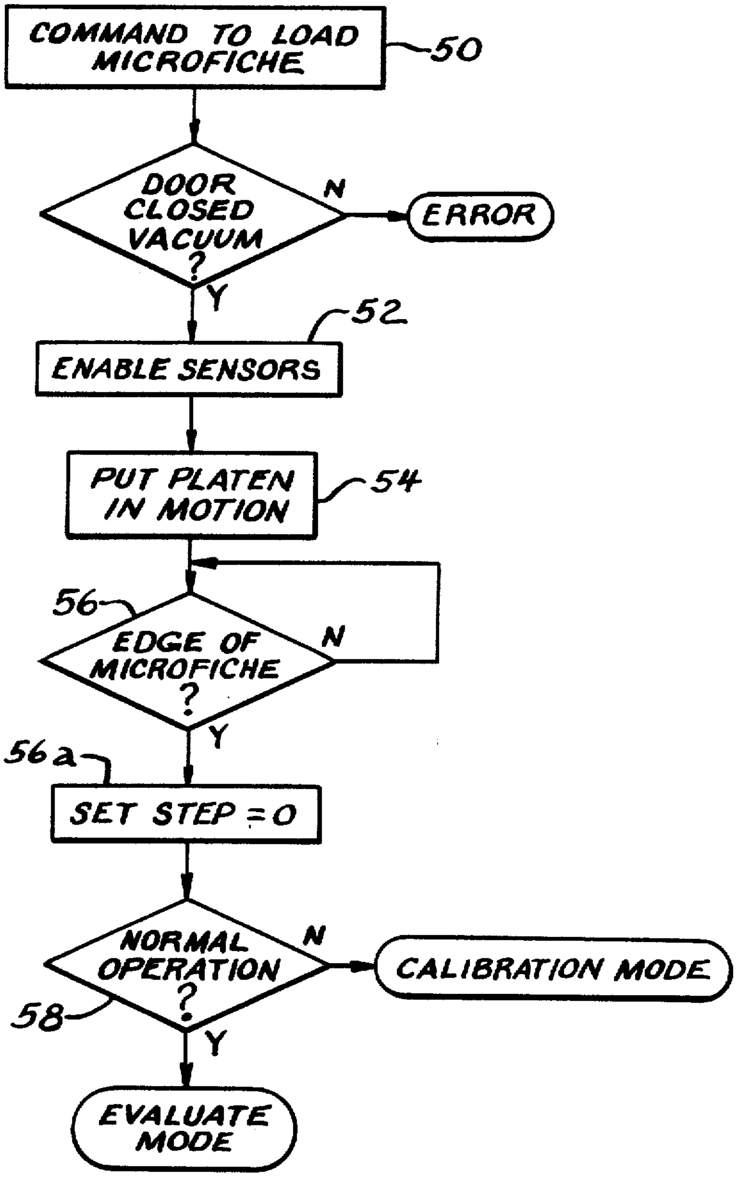
FIG. 4 is a software flowchart illustrating instructions for loading a microfiche into position for analysis by the apparatus of FIGS. 1 and 3.

With reference now to FIG. 4, the calibrate sequence begins at instruction 50 by mounting a "test" microfiche on the platen 22, as previously described. After verifying certain internal operations such as platen vacuum (when, for example, analyzer 10 is a subassembly within an electrophotographic copier), the sensors 16 are energized at instruction 52. At instruction 54, the platen 22 is moved from its load position to a position where the bottom edge of the platen 22a is across from the sensors 16. At this point, all the sensors 16 are producing output data indicating the black background of the platen 22. As previously described, the output of each sensor 16 is input to its corresponding comparator 20c on the scanner board 20, which comparators in turn provide a binary electrical output with a "0" output indicating a black region or low light detection and a "1" output indicating a substantial light detection.

A typical microfiche is imaged with a leader or blank region 18b provided along the perimeter of the microfiche 18. Within the leader portion 18b there should be no dark markings. Thus, as soon as the microfiche edge 18a passes in front of the optical window of at least one of the sensors 16, the highly reflective photoconductive layer reflects a substantial portion of the sensor light back to the photodetector 16b. For example, the photoconductive layer typically may have a transmittance factor of 0.3 (meaning 70% of incident light is reflected), whereas after a frame is developed a region darkened by the fused toner particles (such as the borders 38 in FIG. 2b) reflects back very little light, i.e. approximately 15% of the incident light.

Since the platen 22 presents a non-reflective black surface to the sensors 16, the sensors can easily detect the highly reflective bottom edge of the microfiche 18 as the platen advances past the sensor assembly 14. At this point (instruction 56a), the CPU controller 12 designates the current stepper motor 24 position from the encoder 26 as the "zero" step position (STEP=0). The CPU 12 thereafter counts the number of STEPS as the stepper motor 24 advances the platen 22 past the sensor assembly 14. Each step of the stepper motor 24 is electrically encoded and sent to the CPU 12 by the shaft encoder 26. Similarly, the CPU 12 can control movement of the platen 22 by instructing the stepper motor 24 to advance to or reverse back to a particular step number, in a conventional manner as used with closed loop servomechanisms, as is well known to those skilled in the art.

At instruction 58, the CPU branches to either the Calibrate Mode routine or the Evaluate Mode routine. The operating mode can be selected by a switch or other input means to the CPU controller 12 in a conventional manner.

CALIBRATION MODE

Figure 5:
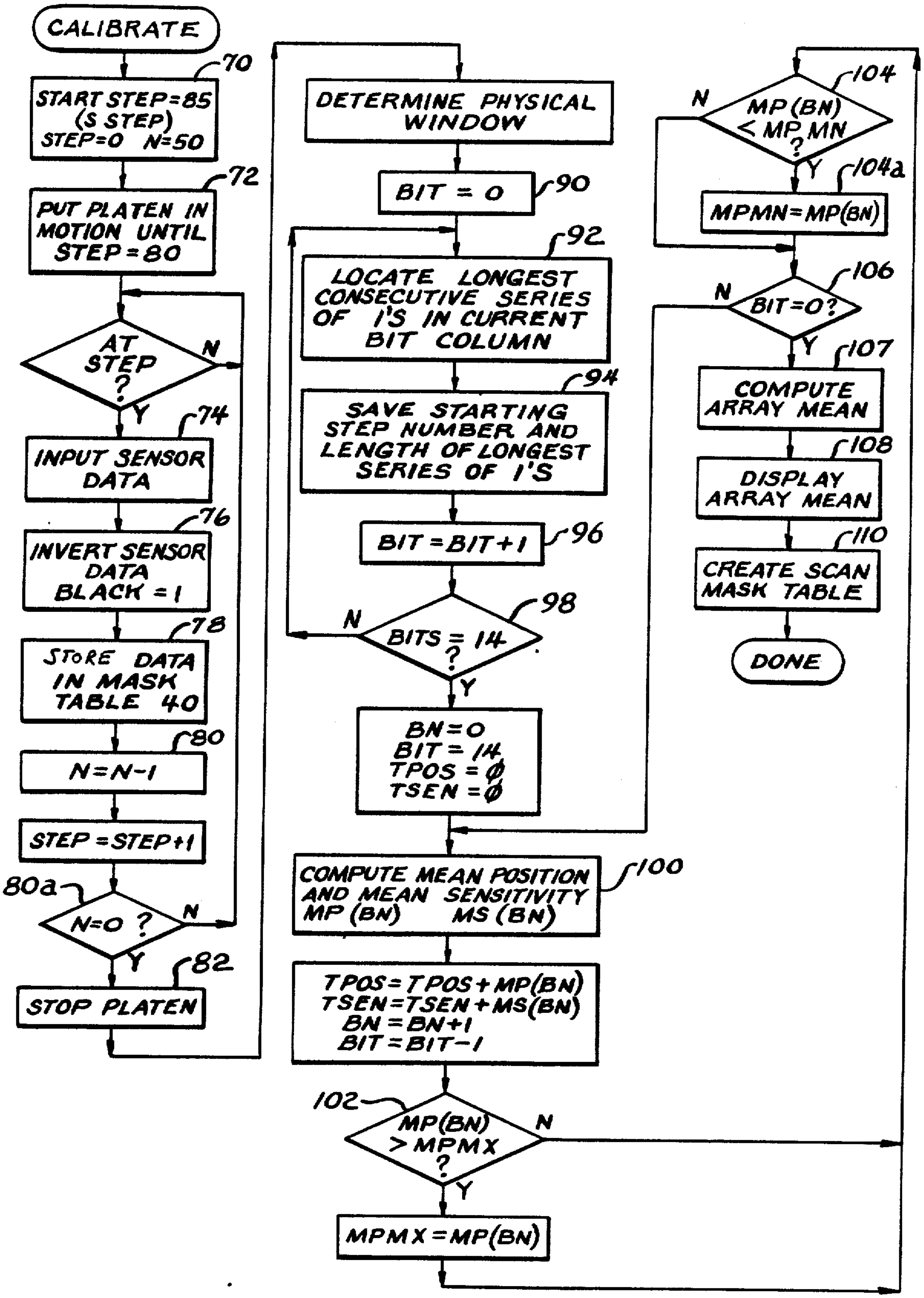
FIG. 5 is a software flowchart for a calibration process according to the present invention.

Referring to FIG. 5, the calibrate operating mode will now be described, keeping in mind that for purposes of calibration, a "known good" microfiche has been loaded for use with the apparatus 10.

The test microfiche includes a sample frame mark 38 in each column of the first row of frames 36. In the example being used, only the bottom portions 38a of the frame mark or borders 38 need to be present on the test microfiche. Only the bottom portions 38a are needed for the calibration microfiche, of course, because only the bottom portion of each frame mark 38 is scanned by the sensors 16 to determine whether the corresponding frame 36 has been imaged.

As previously discussed herein, frame marks other than borders can be used to indicate a frame was developed within a particular imaging area.

In our example, the border portions 38a are positioned on the test microfiche precisely where the bottom border portions will be developed on updatable microfiche. To minimize calibration time, the first (i.e. bottom) row of frames 36 is used for calibration.

Each step or rotation of the stepper motor 24 shaft corresponds to a calculable linear displacement or movement of the platen 22 with respect to the sensor assembly 14. For the stepper motor 24 described herein, each step results in a 0.00123 inch linear movement of the platen 22. Therefore, distances across a microfiche can be put in terms of the number of discrete steps the stepper motor 24 must rotate through to cause any desired distance of movement.

In the example frame mark 38 shown in FIG. 2b, the overall frame size may be 0.50 inches wide by 0.75 inches high including the frame mark border having a depth dimension of about 0.010 inches. Thus, allowing for a typical leader, the borders 38a for the first row of frames can be expected to be positioned at about STEP 105 (referenced to the bottom edge 18a of the microfiche which is STEP 0 as explained above).

Since the width of the border 38 is about 10 thousandth of an inch, in terms of steps the stepper motor 24 will need to advance about 10 steps for the sensors 16 to scan the bottom border portion 38a.

In order to be certain that all the sensors 16 completely scan an entire width of their respective frame marks or borders 38a, for purposes of calibration, data is collected from the sensors 16 starting at STEP 80. The calibration window (N) for data collection is open for 50 steps; that is, data collection continues for 50 steps of the motor 24, beginning at STEP 80 and stopping at STEP 129. Within those 50 steps each sensor 16 should detect its corresponding frame mark 38a somewhere within the column opposite that sensor Thus, at instruction 70 (FIG. 5), the CPU controller initializes the calibrate mode by setting the starting step number (SSTEP) to 85. At instruction 72 the platen 22 is set in motion from STEP 0 (see FIG. 4, instruction 56a) to the starting step number or STEP=80. When the platen 22 reaches STEP 80, the calibration data collection begins at instruction 74. Preferably, the platen 22 advances through the 50 step calibration sequence continuously and at the maximum speed of the stepper motor 24.

Figure 6:
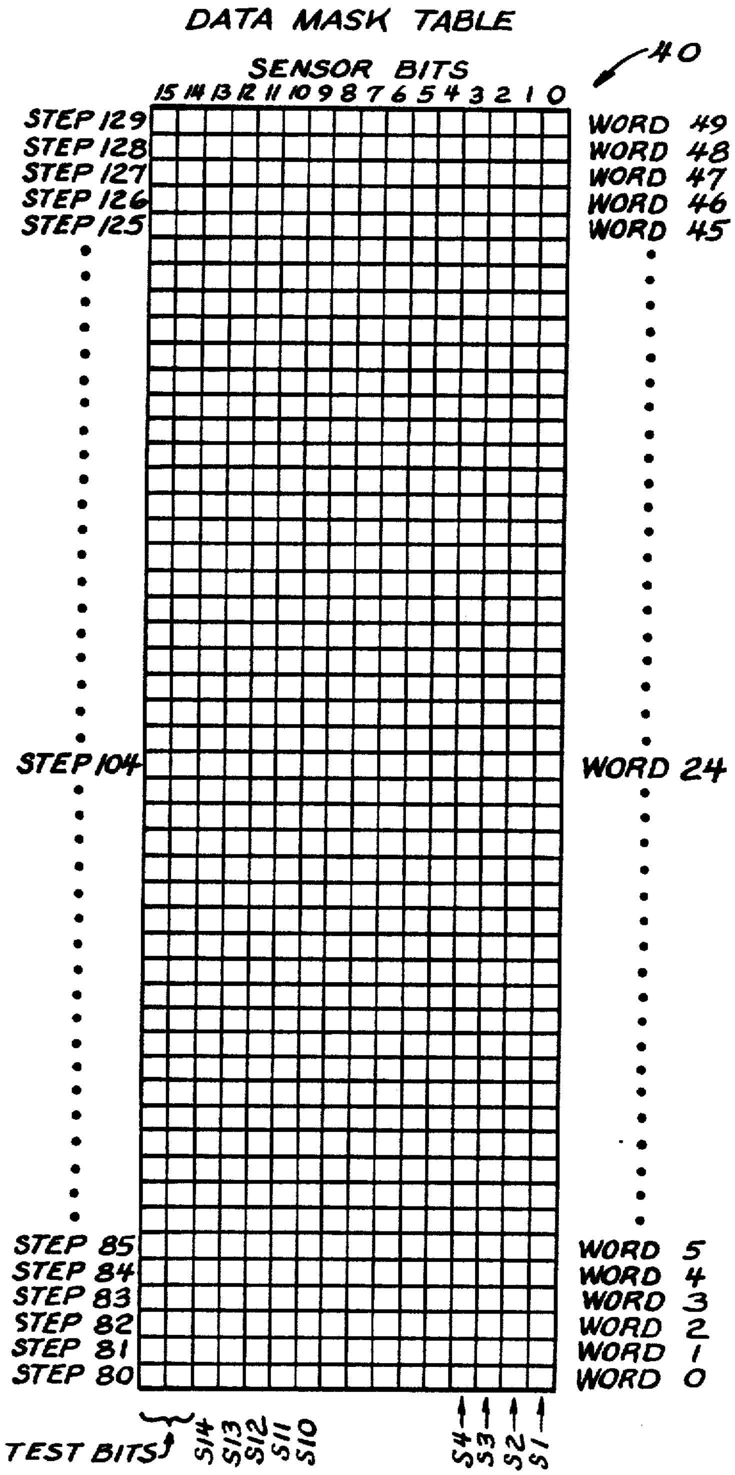
FIG. 6 is a representation of an electronic memory array used for storing a position dependent data mask table.

Data collection by the CPU 12 is a sequential process in which the CPU samples the outputs of the comparators 20c on the scanner board 20, inverts the data therefrom (instruction 76) and then stores the data in a first memory array or mask table 40 (see FIG. 6). As described above, the respective comparators 20c each produce a binary output such that a "1" level indicates the corresponding sensor 16 (S1-S14) is detecting a substantial light reflection from the microfiche 18 which occurs when the small area of the photoconductive layer being scanned within the optical viewing window of the sensor 16 has no image developed—that is, no black toner. A "0" output from a comparator 20c indicates that toner is present within the optical window and thus preventing the reflection of light back to the photodetector part of the sensor 16.

The microprocessor 12a in the CPU 12 is instructed to logically invert the comparator output data so that a binary 1 indicates the sensors 16 are detecting a "black" or nonilluminating imaged area on the microfiche 18. The data inversion can also, of course, be easily implemented in hardware by adding a logic inverter (not shown) at the output of each comparator 20c.

The mask table 40 is physically embodied in a dedicated memory array that can be located either in microprocessor memory or preferably RAM memory. RAM memory 12c is preferred because the mask table data is compressed, reconfigured, and eventually used during a subsequent evaluate mode operation. In order to preserve the mask table data for later use, backup battery power (not shown) is supplied to keep the volatile RAM memory data valid even when system power for the apparatus 10 is removed.

As represented in FIG. 6, the mask table 40 is a 50×1 array of 16 bit words. Fourteen of the bits of each word are used to store the inverted sensor comparator 20c output data, there being one bit of memory in each word corresponding to one of the sensors 16. This is indicated by labelling each of the columns with S1 through S14 on FIG. 6. The extra two bits are used for test purposes. Each word corresponds to the data collected from all 14 sensors during one step of the stepper motor 24. Since the calibration mode uses 50 steps for the calibration window, there are 50 words of memory in the mask table 40. As shown in FIG. 6 then, Word 0 corresponds to STEP 80, Word 1 to STEP 81, on up to Word 49 which corresponds to STEP 129. Thus, during each step of the motor 24, as the platen 22 advances past the sensors 16, the CPU 12 sequentially samples the outputs of the sensor comparators 20c and stores the results in the appropriate bit location of the mask table 40. During calibrate, only one data output sample per sensor per step is stored in the mask table 40. Only one sample per step is taken during calibrate because the confidence level in the data is high when a "known good" clean microfiche is being used.

Figure 6A:
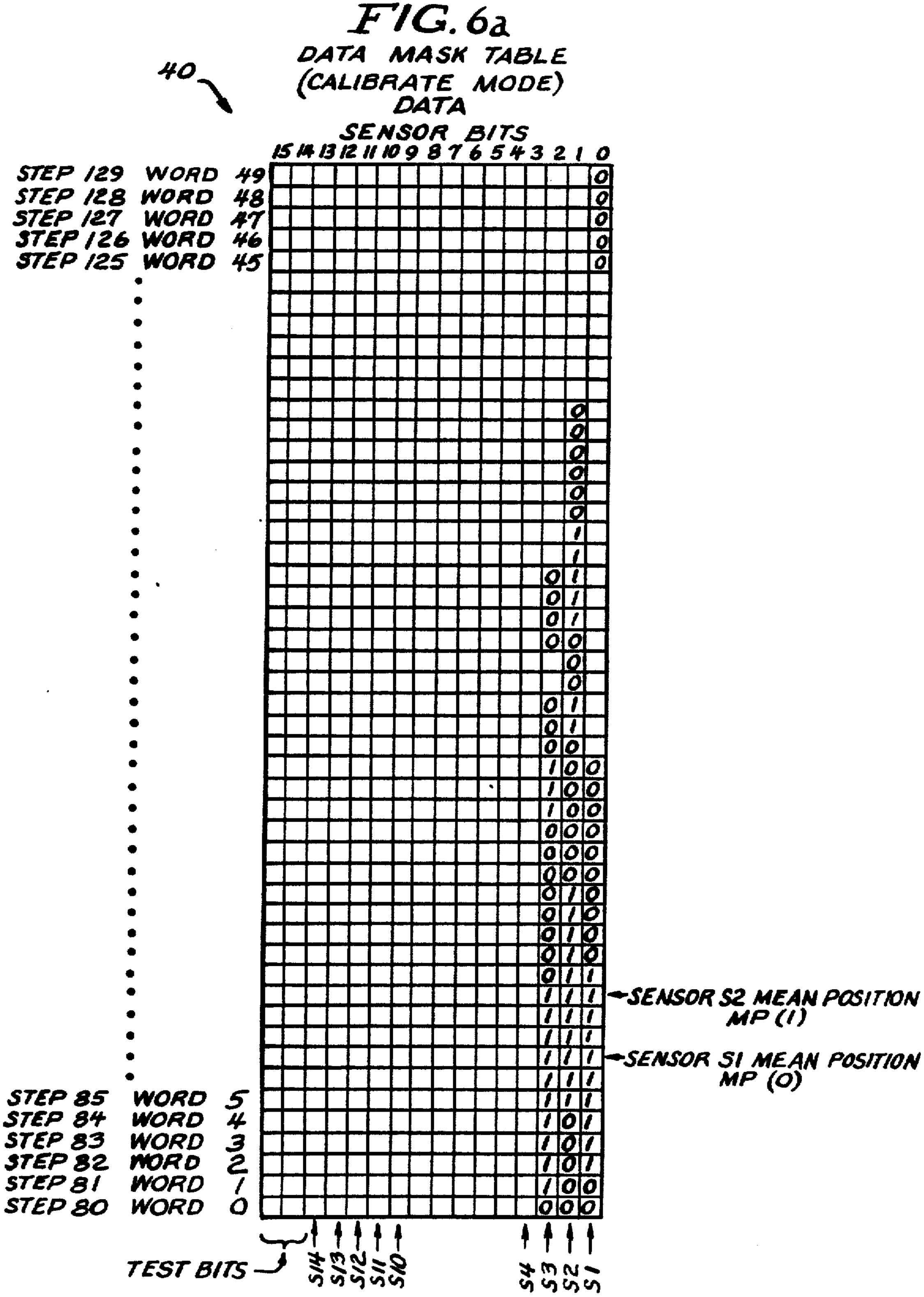
FIG. 6*a* is a representation similar to FIG. 6 for the calibration mode.

Referring again to FIG. 5, after the data outputs of the sensor 16 are stored in the mask table 40 for the first step (instruction 78), the calibrate window counter N is decremented by 1 at instruction 80. At instruction 80a the CPU checks whether all 50 steps have been completed. If not, the CPU loops back and again takes a data sample from each sensor 16 during each step. Eventually, the entire mask table 40 is filled with an array of 1's and 0's. A representative form for the part of the mask table 40 after the 50 step scan is completed is depicted in FIG. 6a.

After the 50th step has been completed, the platen 22 is stopped (instruction 82) and the controller 22 enters a data processing routine which begins at the notation "A" on FIG. 5.

For purposes of explaining the remaining processes carried out during the calibration mode, reference will be made to FIG. 6a. FIG. 6a shows a typical data content for the mask table 40 after the raw data has been sampled and stored during the 50 step calibration data collection sequence (instructions 70–82). The frame mark or border 38 scanned is shown in FIG. 2b. The data contents of the mask table 40 can best be understood by looking at the data for two of the fourteen sensors 16.

Looking for example at the rightmost bit column and the third bit column from the right, let us assume that these bits correspond to the data outputs stored from the sensors S1 and S3 respectively. Remember that each word entry in the table 40 corresponds to one step of the motor 24 and that the first step for data collection was STEP 80.

From the example shown in FIG. 6a, sensor S1 first detected a "black" mark or low light reflection at STEP 82 (WORD 2), but sensor S3 first detected a black mark at STEP 81 (WORD 1). These results indicate a relative misalignment between sensors S1 and S3 since, with a perfect alignment, each sensor 16 could be expected to detect the lower edge of its corresponding frame mark 38a at the same position step. The different first detection step may also indicate that the sensor S3 has a higher light sensitivity than the sensor S1.

FIG. 6a also demonstrates how each sensor 16 is expected to have at least 10 consecutive "1" readings since the frame mark 38 being scanned is about 10 steps in width. Thus, for sensor S1, STEPS 82–91 all are 1's. Of course, depending upon their alignment with respect to the microfiche 18 and sensitivity level some sensors 16 will have more than 10 consecutive "black" readings and some will have less, but they should all be close to 10 and the average number of consecutive 1's should be about 10.

Two new terms can now be explained. Each sensor 16 is said to have a "physical window" (PWIN) defined as the expected area on the microfiche within which area a frame mark is expected to be found. The entire bank of sensors 16 has what is referred to herein as a virtual window (VWIN) which is simply the maximum spread in terms of step numbers between the earliest occuring physical window and the latest occuring physical window for any single row of frames 36.

Since for our example the standard frame mark 38 is 10 steps in size along the scanned vertical axis, the physical window for each sensor 16 for each row of frames 36 is preset at 20 steps; in other words, data from each of the sensors 16 will be accepted from a point five steps prior to the expected start of the frame mark 38 to a point five steps after the expected end of the frame mark 38 as determined for each sensor 16. Thereafter, during an evaluation mode, output data for each sensor 16 will be accepted during 20 consecutive steps for each frame row, with the expectation being that during those 20 steps the corresponding frame mark 38 will pass by the optical window of the corresponding sensor 16.

The size of the physical window (PWIN) is the same for each sensor 16 and the number PWIN = 20 steps was empirically selected based on various test runs. The particular physical window size in steps of course depends upon the actual size of the frame mark 38 being detected and the distance traveled by the platen 22 per step of the motor 24.

Knowing the size of the physical window, however, is not enough. The CPU 12 must also determine the actual step numbers that define the physical window of each sensor 16. This is accomplished as follows, with reference to FIG. 5.

At instruction 90 the controller 12 initializes a loop counter "Bit" to 0. This counter keeps track of which sensor 16 data the CPU is analyzing. Thus, in our example, the 0 bit in each word of the mask table 40 stores the data read from the rightmost sensor S1, bit 1 of each word contains the data from sensor S2 and so on for all the fourteen sensors 16 used in our example.

At instruction 92, the CPU searches for the longest consecutive series of data 1's stored in the 0-bit location. For example in FIG. 6a, the longest consecutive series of 1's for the sensor S1 begins at STEP 82 and ends at STEP 91. At instruction 94 the starting step number for the longest series for sensor S1, in our example STEP 82, and the STEP length of the longest series, 10 (82 to 91 is 10 steps), are saved.

Instruction 96 increments the Bit counter by 1 and instruction 98 checks whether the data for all the 14 sensors has been analyzed. The CPU loops through this subroutine (instructions 90–98) until all of the data in the mask table 40 has been analyzed to determine the starting step number and length for the longest consecutive series of 1's for each bit sensor. At the end of this subroutine, the CPU has stored in memory 40 (either physically in the microprocessor scratch pad memory or other available RAM memory) the first step number for each sensor 16 during which the calibration frame mark 38 was first detected, and the total number of steps for which each sensor detected its corresponding frame mark.

Since the size of the physical window in the evaluation mode for each sensor 16 is preset to 20 steps, and since the physical window determines the exact steps during which output data from the sensors 16 is accepted (in the evaluate mode), preferably each sensor's physical window is centered around the mean or average step position where its corresponding frame mark 38 is expected to be detected. By "mean step position" is meant the average STEP number for the longest continuous series of 1's. For example, suppose from the raw data collected during the 50 step calibration window the mean position of sensor S1 is STEP 87 (as in FIG. 6a) This is calculated at instruction 100 by taking the first STEP number at which the longest series of 1's begins and adding to it one-half of the total number of steps for the continuous series. Thus, as shown in FIG. 6a, the mean step position for sensor S1 can be calculated as:

$$\text{Mean Position} = \text{First STEP(series)} + \tfrac{1}{2}\times(\text{Total steps}) = 82 + \tfrac{1}{2}(10) = 87$$

The mean position number, 92, for sensor S1 means that for the test microfiche, at STEP=87 Sensor S1 was at the middle of the S1 frame mark 38, and half of the "black" readings for sensor S1 occurred in the next five steps after STEP 87 and the other half had occurred in the five steps just preceding STEP 87. Thus, if the test microfiche were actually a production updatable microfiche and the lowest (Row 1) imaging area 36 in column 1 was imaged, the frame mark would be detected by sensor S1 during STEP 82 through STEP 91, centered around STEP 87.

When calculating the mean step position for each sensor 16, of course, if the total number of 1's in the longest continuous series is an odd number, the mean position is rounded off to the nearest whole STEP number since only discrete full step numbers are used with the stepper motor 24.

In addition to the mean step positions, the data collected during the calibration scan (instructions 70-82) provides a sensitivity measure for each sensor 16. Sensor sensitivity is the total number of "blacks" detected by each sensor 16 out of the 50 samples taken. Clearly, the more sensitive each sensor 16 is to light reflection the fewer 1's appear in the mask table 40. This sensitivity number for each sensor 16 is calculated at instruction 100 and stored in memory as variable MS(BN) for use during the evaluation mode of operation.

Referring again to FIG. 5, the variable MP(BN) represents the mean position in terms of STEP number for each of the fourteen sensors 16 in our example, where BN is the word bit number for each sensor 16 and MP is an abbreviation for mean position. Thus, in the MP(BN) memory array, the mean position for sensor S1 is stored at MP(0). For sensor S3, it is stored at MP(2) and so forth.

Instructions 102 and 104 perform iterative comparisons between all the mean positions for the fourteen sensors 16. The end results at instructions 102a and 104a are the highest or maximum mean position, MPMX, and the lowest or minimum mean position, MPMN, respectively. Again, these values are defined in terms of a STEP number.

The sequence of calculating mean positions and sensitivity for each sensor 16 is controlled at instruction 106 by checking that the data for all 14 sensors has been analyzed. After all individual mean positions and sensor sensitivities are computed as well as position and sensitivity means for all the sensors as a unit (instruction 107), they can be displayed on display unit 30 (instruction 108) so that an operator can determine whether one or more of the sensors 16 are misaligned or not fully operational, or whether as a group the sensors 16 on the assembly 14 are too far out of alignment or are not sensitive enough.

Figure 7:
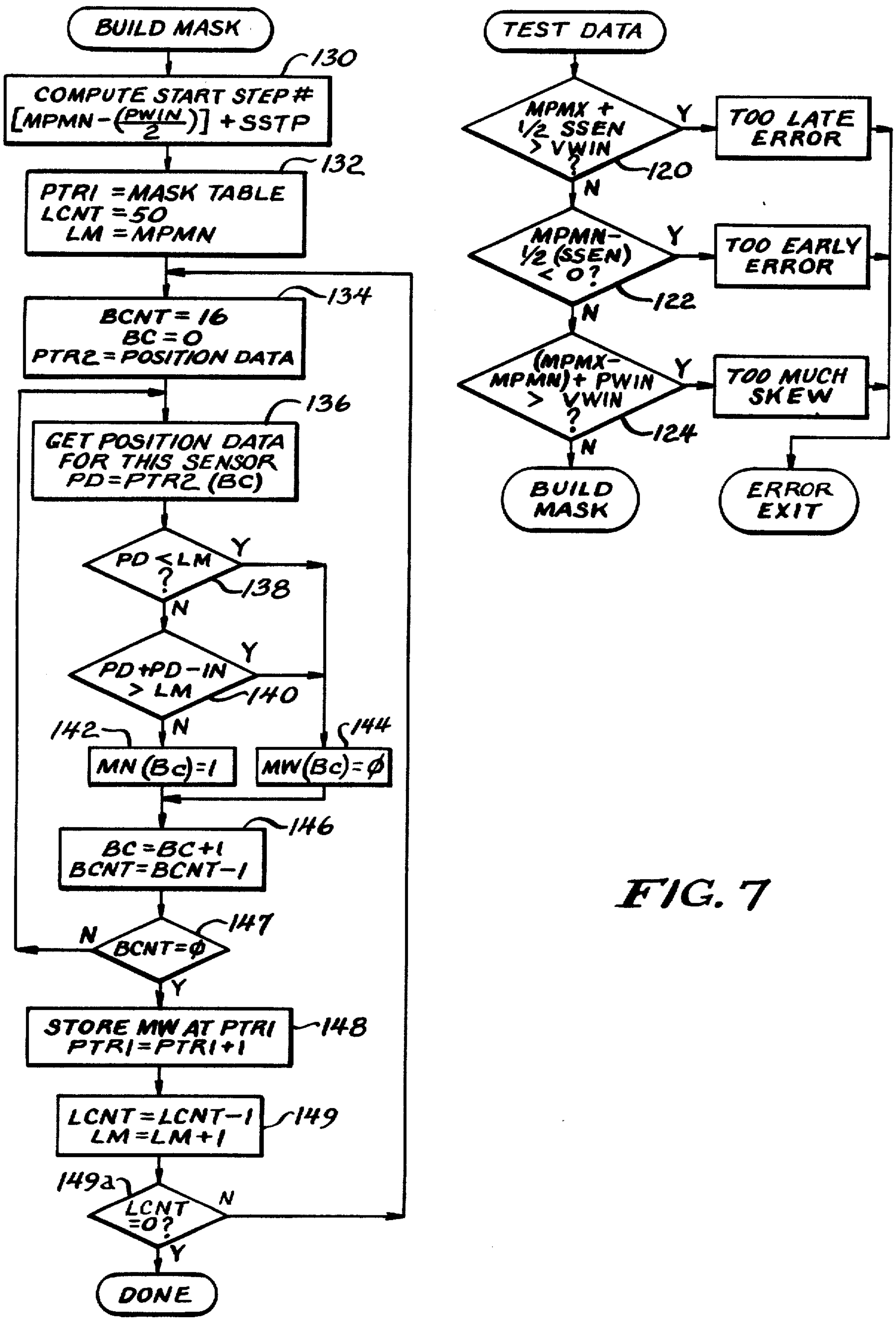
FIG. 7 is a software flowchart for a calibration process which creates a mask table as shown in an exemplary manner in FIG. 6.

The TEST DATA subroutine shown in FIG. 7 verifies that the overall alignment of the sensors 16 is within a predetermined tolerance. At instruction 120, the CPU 12 checks whether the maximum or highest mean position, MPMX, is within one half the average array sensitivity (from instruction 107, FIG. 5) of the end of the virtual window (VWIN). If it is not, the data from that highest position (latest) sensor 16 will occur too late (i.e. outside the scan window) and not be sampled, and therefore realignment is needed.

At instruction 122, the CPU 12 checks whether the minimum or lowest mean position, MPMN, is within one-half the average array sensitivity of the beginning of the virtual window. If not, the corresponding sensor 16 data, which is for the earliest sensor 16, will occur too early and be missed during the scan. Again, realignment in such a situation would be needed.

Finally, instruction 124 checks whether the step spread between the minimum and maximum mean positions (MPMX-MPMN) is less than 20 steps of the size of the virtual window (VWIN). If not, there is too much skew between the earliest and latest sensors 16, and realignment is needed. In that event, an error signal is generated, and the branch to the Build Mask routine is inhibited.

The last principal operation during the calibrate mode is to replace the raw data collected during the calibrate scan (instructions 70–82) with data for use during the evaluate mode. At instruction 110, the CPU controller 12 creates the evaluate or data screen mask table 40′ by branching to the BUILD MASK routine depicted in FIG. 7.

Since much of the following discussion will concern calibration elements such as the mask table 40 which are also used during evaluation, a prime (1) will be used to distinguish elements used in both modes, with the prime indicating evaluation mode.

Modified mask data for the evaluate mode is needed to maximize the efficiency of the evaluation mode. To this end, the mask table 40' is used by the CPU 12 during the evaluate mode to determine when output data from each of the sensors 16 will be accepted as valid and stored in another memory array for further processing, as will be explained in greater detail below.

The physical window routine (instructions 90 100), described above provides the mean position for each sensor 16 relative to the microfiche 18 in terms of a STEP number. Since the empirical physical window size is preset to 20 steps, the mask table 40' is created by centering a series of 20 consecutive 1's around the mean position for each sensor 16.

As described above, the calibrate mask table 40, and hence the evaluate mask table 40', is a 50×1 array of 16 bit words. Each bit corresponds to one of the fourteen sensors 16 (S1–S14) The extra two bits are used for test purposes. Each Word corresponds to one step of the motor 24. A "1" stored in a bit location in the evaluate mask table 40' means that for the corresponding STEP during evaluation, the respective sensor 16 output data is to be accumulated and stored. This is referred to as "opening the window" for that sensor. Conversely, a "0" stored in a bit location means the respective sensor 16 output data is to be ignored (i.e. the window is closed). It should be kept in mind that during a scan operation the sensors 16 are always energized and therefore outputting data to the comparators 20c which also continuously output the digitized data—the mask table 40' thus determines which portions of that data stream will be accepted as valid.

It is worth noting the different type of data originally stored in the mask table 40, as compared to the data subsequently stored in the evaluate mask table 40'. The original calibrate mask data is an array of 1's and 0's that indicate actual "black" or "light" readings taken at specific STEPS during a single row scan of a test microfiche. These readings are position dependent in that they define which steps each sensor 16 is able to scan its corresponding frame mark 38 for one row of frames 36. In contrast, the array of 1's and 0's stored in the evaluate mask table 40 indicate which STEPS during a row scan the data outputs from the sensors 16 will be accepted. These two types of data, however, are interdependent in the sense that a calibrate mask 40 "1" is effectively an indication that data read at each corresponding STEP during evaluation is expected to be valid based on the readings taken from the test microfiche. The evaluate mask physical window for each sensor is simply limited to 20 steps centered around the relative mean position of the sensor.

Figure 8:
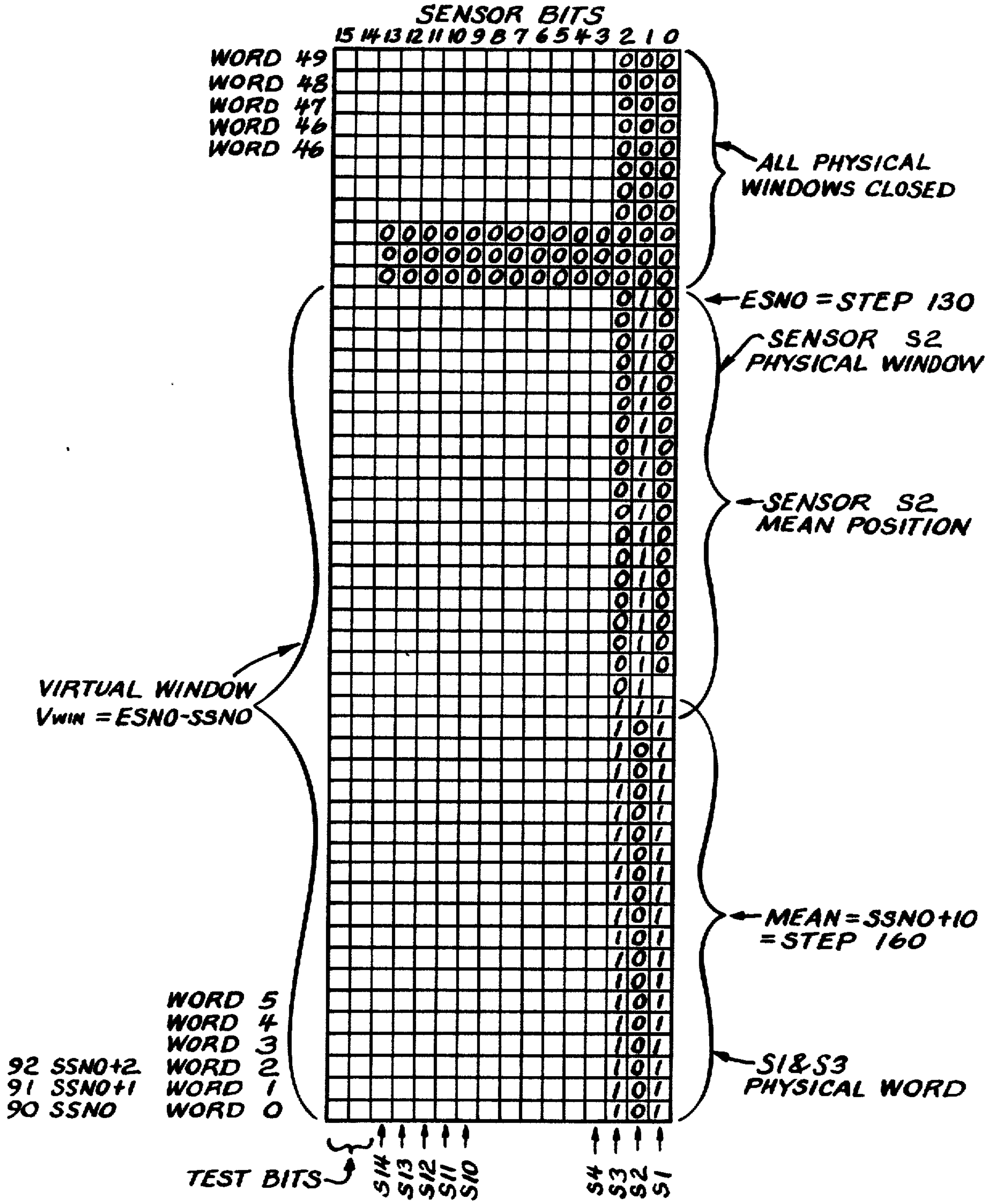
FIG. 8 is an example representation of typical data values stored in a data mask memory array after a calibration sequence in accordance with the present invention.

With reference to FIG. 8 and FIG. 7, an example of an evaluate mask table 40 created by the process shown in FIG. 7, instructions 130–149*a*, will now be explained. The mask table 40' is a "zeroed" table in that the first word in the table (Word 0) includes at least one "1" bit. In other words, at least one of the sensors 16 will have an open window (data valid) when the first word of the mask table 40' is accessed. Thus, Word 0 in the mask table 40' defines the earliest step at which any one of the sensors 16 will have an open window. This "zeroed" aspect of the mask table 40 is accomplished by first determining which sensor 16 has the lowest mean position, MP(BN)=MPMN, in terms of STEP numbers. Since the physical window (PWIN) is 20 steps, the earliest step at which any one sensor can first detect a frame mark 38 is MPMN−½(PWIN)=MPMN−10 steps. For the particular sensor 16 having the lowest mean position, (or sensors if more than one sensor has the same minimum mean position) a "1" is placed in the corresponding bit position for Word 0 and the next 19 consecutive bits (for Words 1-19) are all 1's.

For example, assume in FIG. 8 that sensors S1 and S3 had the lowest mean positions, MPMN, both equal to STEP 100. The physical window for both sensors opens at STEP 90 (100−½PWIN=100−(20)). Word 0, then, in the mask table 40', corresponds to STEP 90, Word 1 corresponds to STEP 91, and so on. The CPU 12 stores the starting STEP number 90 (SSNO=90) since reaching that step during evaluation mode will be the indication to access the mask table 40' data. Furthermore, for Words 1 through 19, the same bits which correspond to sensors S1 and S3 all store a "1" data value. For the remaining 30 words in the mask table 40', those same bits are all 0's (because the window is only open for 20 steps).

Similarly, the CPU 12 must determine the last step during which the output data from the last sensor or sensors is to be accepted. That is, the ending step number (ESNO) is the STEP which corresponds to closing the physical window for the sensor or sensors 16 having the latest or furthest mean position (MPMX).

For example, in FIG. 8, assume sensor S4 has a mean position of STEP 120, and that this is the highest mean position of all fourteen sensors S1–S4 (MPMX=120, from instruction 102*a*, FIG. 5). This means that sensor S4 will be the last active sensor in terms of when its physical window is open for valid data. Since the physical window size (PWIN) is 20 steps, the last step number at which any sensor (in this example sensor S4) is outputting valid data to be analyzed is ESNO=MPMX+½(PWIN)=MPMX+10. Thus, ESNO is equal to 120+10=130 when MPMX=120. After STEP 130, no sensor 16 has an open physical window.

It should be kept in mind that during the calibrate mode, all of the STEP calculations are referenced to calibrate starting step number (SSTP) 80. When the mask table 40' is generated, the table is zeroed out in the sense that the 85 step reference is substracted from all the position data such that Word 0 in the table corresponds to the STEP at which the first physical window opens (SSNO), not STEP 80. This is so that the same mask 40 data can be used to evaluate each and every row of frames 36 on the microfiche 18.

The remaining bits for each sensor 16 in the mask table 40' are filled in during the BUILD MASK routine of FIG. 7 (instructions 130–149*a*) by entering the first "1" in the appropriate bit location within the Word corresponding to STEP=MP(BN)−½ PWIN=MP(BN)−10. Again, the same bits in only the next consecutive 19 words store a "1". This process is done for each sensor 16 to thereby map its physical window in the array 40'.

As previously described, the CPU 12 calculates both the minimum mean position, MPMN, and the maximum mean position, MPMX (instructions 102 through 104, FIG. 5). The earliest physical window opens at MPMN−½PWIN and the latest physical window closes at MPMX+½PWIN. These two extremes (between the STEP when the earliest sensor 16 is first sampled, and the STEP when the latest sensor 16 is last sampled) is what has been defined above as the virtual window (VWIN).

By way of summary then, at the end of the calibration mode, the mask table 40' stores an array of data that indicates at which steps each of the fourteen sensors' 16 output data is to be accepted as valid; that is, the mask table 40' stores the relative position dependent physical window characteristics for each sensor 16.

It can now be appreciated that the mask table 40 data will be accessed each time the analyzer 10 scans a row of frames 36. In our example the microfiche 18 has eight rows of frames 36, so the mask array will be accessed eight times since the sensors 16 are used to scan for a frame mark in each row of frames 36. The same mask table 40 can be used for all eight rows because the relative alignment of the sensors 16 with respect to the frame marks 36 should be offset the same amount row to row.

EVALUATION MODE

Figure 9:
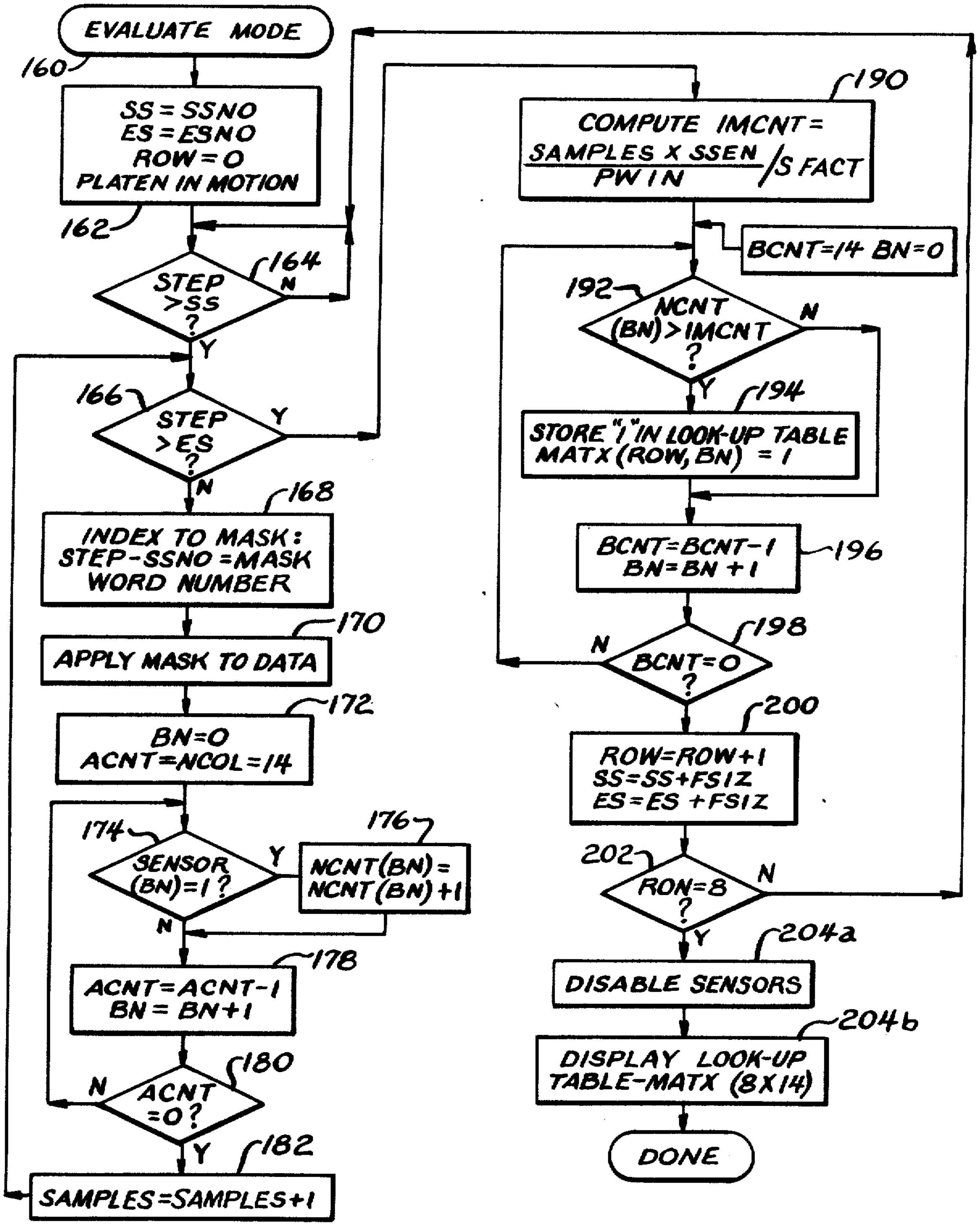
FIG. 9 is a software flowchart for an evaluation process suitable for analyzing an updatable microfiche represented in FIGS. 2*a*–2*c*.

With reference now to FIGS. 9 and 10, the evaluate mode of operation will be described. The evaluate routine can be run for any microfiche having a predetermined array of frames 36. In our example, the updatable microfiche 18 has an 8×14 array of frames 36 arranged in generally parallel rows and columns.

With reference first to FIG. 10, there is shown a second memory matrix 150 called a look-up table. The look-up table 150 is an 8×1 memory array of 16 bit words. Each word (W0–W7) corresponds to one of the eight rows of frames 36'. Fourteen of the sixteen bits in each word correspond to one of the fourteen frames 36' in each row on the updatable microfiche 18'. The remaining two bits in each word are for test functions.

The principal object of the evaluate routine is to fill the look-up table array with binary data that indicates which frames 36' are imaged (i.e. contain a frame mark 38'). A binary "1" can designate, for example, that a frame 36' is imaged, and a "0" can designate a frame is not imaged. Thus, a completed look up table provides a complete map of the scanned microfiche 18' by storing which frames 36' are imaged and which are available to be imaged. The CPU 12, or other processor in the overall imaging system, can then control non-sequential imaging of the microfiche, and as each frame is added to the microfiche 18' the look-up table can be easily updated. By way of example, the look-up table depicted in FIG. 10 could correspond to the typical updatable and partially developed microfiche 18 shown in FIG. 2c.

With reference to FIG. 9, the CPU controller 12 enters the Evaluate Mode at instruction 160 after completing the LOAD routine (instructions 50–58). The starting step number (SSNO) and ending step number (ESNO) are retrieved at instruction 162. As explained above, these STEP values define the virtual window for scanning one frame row on an updatable microfiche 18' and were calculated from the sensor 16 relative position data obtained during the calibrate routine. The bottom row of frames 36' is scanned first since in the preferred embodiment, the platen 22 moves vertically down during an evaluation scan. The variable "ROW" is used to track which of the eight rows is presently being scanned with ROW=0 being the first row. A two-dimension memory matrix, MATX, which stores the look up table 150 (FIG. 10), is initialized or zeroed since the microfiche 18 has an unknown image pattern.

The platen 22 is advanced by the stepper motor 24 from STEP 0, which corresponds to the sensor assembly 14 detecting the bottom edge of the microfiche 18a' (instructions 56, 56a), to the starting step number (SSNO). This occurs at instruction 164. It should be kept in mind that the platen 22 is moved in one continuous sequence of steps through the entire virtual window for all eight rows of microfiche frames 36'. The stepper motor 24 preferably is operated at maximum speed, and the platen 22 is not stopped, thereby minimizing evaluation time.

By way of illustration, let us assume that the analyzer 10 is scanning ROW 0 (the bottom row) and that the current STEP number is SSNO or as in our prior example STEP=SSNO=90. As explained above, SSNO is defined as the first step during which at least one of the sensors 16 has an open physical window, meaning that data from that sensor 16 should be accepted.

Since the current STEP is equal to SSNO, the CPU 12 must access the mask table 40' data to determine which sensors 16 have valid data outputs. Word 0 in the evaluation mask table 40' (see FIG. 8) corresponds to STEP=SSNO since both Word 0 and SSNO define the first STEP at which a physical window is open for one of the sensors 16. By simply substracting SSNO from the current STEP number, the CPU 12 knows which mask table 40 word to address. In our present example, the platen 22 is at position STEP=SSNO=90, so CPU 12 must access STEP-SSNO=90−90=0 or Word 0 in the mask table 40'.

If, for example, the current STEP number is 102, the CPU 12 would access Word 12 (STEP SSNO=102 90=12) in the mask table 40', and so on. The CPU 12 sequentially proceeds through each word of the table 40' until the entire virtual window has been scanned. So long as the current STEP number is within the virtual window, in other words STEP<ESNO, at least one sensor 16 has an open physical window.

As explained above, each bit in Word 0 of the mask table 40' corresponds to one of the 14 sensors. The remaining two bits in Word 0 are for test purposes. If a "1" is stored in a bit location, the data output during STEP 90 from the corresponding sensor 16 is to be stored. Conversely, "0" indicates that for STEP 90 the data output for the corresponding sensor 16 is ignored.

It should now be evident that the mask table 40' created during the calibrate mode acts as a position dependent electronic mask or filter to control which data output streams from the various sensors 16 will be accepted as valid. The mask 40 sensor position data is a function of the relative alignment between each of the sensors 16 and the expected frame mark 38 positions, calibrated from a "known good" microfiche. Use of the data mask 40 automatically compensates for possible variations in actual physical position of the sensors 16 with respect to the microfiche 18 and platen 22. By using a dynamic calibration process, the mask table 40' can be updated so as to compensate for the fact that over time the relative positions of the sensors 16 and microfiche 18 may change just from repeated use of the platen 22. Use of the electronic mask also automatically compensates for variations from machine to machine such as sensor 16 alignment and the actual stepper motor 24 speed since data collection is dependent on the step number and relative positions, not speed of movement of the platen 22. As will be explained below, the mask table concept also compensates for variations in the actual location of the frames on an updatable microfiche by allowing calibration from a "production run" microfiche as opposed to a "test" microfiche.

Referring again to FIG. 9, at instruction 168 the CPU 12 accesses the correct mask word for the current STEP number as described above. At instruction 170, the data stored in Word 0 is applied to the data outputs from the sensors 16 and comparators 20c. Since the mask 40 data is binary and the sensor output data from the comparators 20c is also binary, the output data streams can be masked by a simple AND operation. The AND operation can be done through system software or hardware in a known manner. The AND d results for each sample is temporarily stored in memory location Sensor(BN).

At instruction 172, internal loop counter ACNT is set to the total number of sensors 16, which in our example is fourteen. Also, the bit number (BN) is initialized to 0 which indicates that the data output from sensor #1 will be first analyzed which we have labelled S1 in our example.

At instruction 174, the CPU 12 samples the masked data output from the comparator 20c for the first sensor S1. If the value is a "1", it means that sensor S1 "saw" a black mark, and the CPU 12 increments a counter NCNT(BN) by 1 where BN=0 for sensor S1. This is done at instruction 176. If the masked data output Sensor(BN) is a "0", the NCNT(BN) memory is not incremented. Clearly, if the mask table 40' data is 0 for sensor S1 at STEP 90, the AND'd output is 0, and the counter NCNT (BN) is not incremented whether the corresponding comparator 20c output was a 1 or 0.

At instruction 178, the bit (sensor 16) counters are updated and at instruction 180 the CPU 12 checks whether all fourteen sensors 16 have been sampled. After the masked data outputs for each sensor 16 have been sampled and stored, the program increments a sample number counter, SAMPLE, and loops back to instruction 166.

The sequence of sampling and accumulating the masked data outputs from the sensors 16 is repeated over and over (instructions 166–182) as long as the current STEP number is within the virtual window (checked at instruction 166). Each "1" or "black" reading from each sensor is accumulated (added) to the prior total. The virtual window defines the beginning and end steps for the physical windows of the earliest and latest sensors 16 for one row of frames 36.

It should be noted that, unlike the calibration scan for which only one data output sample is taken per sensor 16 per step, during the evaluation mode as many samples are taken as possible to maximize confidence in the data. That is, the data sampling loop defined by instructions 166 to 182 is repeated as fast as the microprocessor controller 12 can execute, independent of the speed of the stepper motor 24. It should be apparent that the faster the stepper motor 24 advances the platen 22, the fewer number of samples per sensor 16 per step can be taken. Preferably, at least two or three samples per sensor 16 are taken during each STEP in the evaluation mode.

Since more than one sample per step is taken, the total number of samples taken during one complete virtual window scan must be stored, hence the use of the SAMPLE counter at instruction 182. This allows the CPU 12 to then normalize the accumulated readings since, during calibrate, the sensitivity readings are all based on one sample per step. This will be explained in greater detail shortly.

At the end of the first virtual window then, all of the sensors 16 will have scanned portions of their respective frames 38', and the CPU 12 will have sampled and stored output data from the sensors 16 for specific "physical window" portions thereof, for one row of frames 36' on the microfiche 18', as determined by the relative position data for each sensor 16 stored in the mask table 40'.

After the first row scan across the virtual window is completed, the CPU 12 branches to instruction 190. This instruction computes the minimum number of "black" samples, called IMCNT, that will be accepted by the CPU 12 as representing a frame mark 38 or imaged area. Since the number of samples taken per row scan varies for each row and machine, the value of IMCNT must be computed for each row. The calculated value of IMCNT is thus a calibrated standard value determined from the average sensitivity, SSEN, of all fourteen sensors 16, which were determined during the calibration mode, according to the following equation:

$$IMCNT = \frac{(\text{Samples} \times SSEN)}{Pwin} / Sfact$$

The above equation states that the minimum number of "blacks" accepted as representing that any sensor 16 detected a frame mark 38 within its physical window (PWIN) for the current row of frames 38, is equal to the product of the number of samples taken during the virtual window scan (SAMPLES) and the average sensor sensitivity (SSEN), divided by the size of the physical window (PWIN), reduced by an empirical factor (SFACT). The empirical factor, SFACT, represents the percentage of samples compared to calibration that is required for an image or frame mark to be verified. Preferably, SFACT is set at 50% or in The IMCNT equation follows from the fact that the ratio SSEN/Pwin defines the average number of "blacks" per STEP detected during calibration. By multiplying this ratio by SAMPLES, the calibration data is normalized to the number of samples per step taken during an evaluation scan. Conversely, the evaluation scan data could be normalized by taking the number of accumulated "blacks" stored in NCNT(BN) and dividing by the total SAMPLES taken. Dividing by a factor of two (SFACT) simply means that confidence in the data is sufficiently high that only ½ as many "blacks" are needed to confirm a frame mark 38 as were detected during calibration. By adjusting SFACT higher or lower than two, the designer can impose a respectively looser or tighter requirement on the sensor 16 data.

After ICMNT has been calculated for the current row, the CPU 12 enters an iterative comparison loop defined by instructions 192 to 198. For each sensor 16, the CPU 12 compares the total number of 1's or "blacks" detected, stored in NCNT(BN) at instruction 176, with the minimum acceptable calibrated standard, IMCNT. If the sensor 16 output data or detected number of "blacks" is greater than IMCNT, the data indicates a frame mark 38 was detected by that sensor 16. At instruction 194 then, the look-up table 150 (see FIG. 10), represented by the two-dimensional memory matrix MATX(ROW, BN), is updated by placing a "1" in the bit location corresponding to ROW 1 and the respective sensor 16 (column). For example, if sensor S14 had detected a frame mark 38' within its physical window, the test NCNT(14)>IMCNT would be satisfied and a "1" would be stored at bit MATX(0, 14).

Instructions 196 and 198 update the internal counters and ensure that the data for all of the sensors 16 (columns) is analyzed for the current row. Thus, for example, if all fourteen sensors S1–S14 detected a frame mark 38', the entire first row of the look-up table 150 (shown in FIG. 10) would be 1's. If a particular bit in the matrix 150 is a "0", it indicates that the corresponding frame, 38 has not been imaged.

Referring again to FIG. 9, at instruction 200, the CPU controller 12 increments the ROW counter and updates the starting and ending step numbers (SS and ES) for the virtual window to be used when scanning the next row of frames 36' on the microfiche 18'. On an updatable microfiche, such as shown e imaged on the microfiche within tight tolerances. Hence, in terms of steps for the motor 24, the travel distance from one row of frame marks to the next adjacent row of frame marks (or any other row) can be precisely calculated. The frame size, FSIZ, then, indicates in units of STEPS, where the next row of frame marks can be expected to occur. By adjusting the SSNO and ESNO numbers according to the FSIZ value, the mask table 40' can again be indexed into for use in scanning the second and third frame rows and so on until all eight rows are scanned and the look-up table is completed The row number check is done at instruction 202. If all eight rows have not been scanned, the CPU 12 loops back to instruction 164 and scans the next row of frames 36'. If all rows have been scanned, the program exits and ends the evaluation mode by terminating power to the sensors 16 (instruction **204*a*), and if desired providing a visual display of the completed look-up table 150 on the display unit 30 (instruction 204*b***).

Another important advantage of the present invention is evident from the great flexibility achieved by use of dynamic calibration. While factory calibration using a "known good" microfiche is often satisfactory, it is contemplated the present invention will be a subassembly or add-on feature of an overall microfiche imaging system. Thus, the platen 22 would not only transport the microfiche during a calibration or evaluation scan, but would also serve as an imaging plate in a photocopy reducing machine. Further, the CPU controller 12 could either have sufficient capacity to control the overall imaging system or could easily be interfaced with another system microprocessor controller by, for example, sharing a common memory or I/O communication.

In such situations, a primary benefit of this invention is the capability of loading in a partially developed microfiche, having the analyzer 10 scan the microfiche to determine which frames can be imaged, and then using the look-up table or frame map to continue with computer controlled non-sequential imaging of the microfiche.

However, over time it can be expected that the imaging system will not continue to always locate imaged frames on the microfiche within the same close tolerances as a newer or recently refurbished imaging machine. Consequently, the calibrated mask table 40 might no longer store accurate position data on the relative position of the sensors 16 with respect to the expected frame mark locations. Furthermore, slight variations from machine to machine may make use of a standard test microfiche less effective.

The dynamic calibration of the present invention obviates all these possible drawbacks by accommodating a calibration mode based on microfiche imaged by the particular imaging system used in combination with the present invention. By using in place of a "known good" microfiche, one that has been imaged by the host system, the calibration data and mask table data is automatically standardized to that particular host imaging system. Therefore, even if the host imaging system does not locate frames precisely within factory specifications, the analyzer 10 will still operate properly (assuming that the worst case alignment criteria specified in instructions 120–124 are met).

Another advantage of the present invention is that the unique signal processing and scanning methods described and claimed herein minimize false readings otherwise caused by contaminants on the microfiche such as dust, dirt and fingerprints. As a practical matter, microfiche are often subjected to substantial and often improper handling, poor care and unclean environments. The extremely miniaturized frame sizes, and consequently small scannning areas (optical windows of the sensors), make an optical scanner susceptible to false readings. For example, a fingerprint can reduce the light reflectivity of the photoconductive layer (or cause light scattering) sufficiently to appear to the sensor 16 that the area is dark as with toner.

In the case of dust and dirt, not only would the contamination have to be precisely located within a sensor's physical window, but also it likely would be too small to cause enough "black" readings from the sensor to meet the IMCNT criteria. In contrast, just taking a "snapshot" scan could pick up dirt and be wrongly read as a frame mark. Dirt and dust large enough to cause a "valid" frame mark result probably would be visible and wiped off before scanning. Likewise, a fingerprint, while it could provide an errant "snapshot" reading, usually will not obliterate the entire physical window of a sensor, and hence will not be detected as a frame mark.

Thus, by scanning for a frame mark over only a limited area of the frame (PWIN) and comparing the results to a "known good" scan, the risk of erroneous readings is minimized while at the same time providing a fast and electronically automatic way to scan and map the frames and frames of an updatable microfiche.

Again, the particular examples used for explanation in array with rectangular borders as frame marks, were for illustration and meant only to be examplary in nature. No limitations should be construed from the particular microfiche imaging arrangement, or frame mark design. For example, the frame marks used could be one of any number of designs so long as they will generally be developed at a predetermined location on the microfiche.

Clearly, the relative movement between the microfiche and sensor assembly 14 can be effectuated in equivalent ways. The platen 22 could be stationary while the sensors move. Or, a left to right scan could be used (as with a vertically aligned scanner assembly 14) or the platen 22 and scanner assembly could lie in horizontal planes. Those skilled in the art will also appreciate that many of the process steps carried out by software can be implemented by hardwired circuitry.

Thus, while the present invention has been illustrated and described in term of preferred embodiments and exemplary uses, this is for the purpose of illustration rather than limitation, and other variations and modifications of the specific embodiments herein shown and described will be apparent to those skilled in the art all within the intended spirit and scope of the invention.

What is claimed is:

1. Apparatus for electronically mapping imaged and unimaged frames on an updatable electrophotographic medium having a plurality of frames arranged in columns, each imaged frame having a detectable frame mark, comprising:

a. means for optically scanning all frames to detect said frame marks,
b. means for moving the medium relative to the scanning means so that each column of frames including any frame marks passes through an optical window of said scanning means;
c. said scanning means providing electrical output signals indicative of the presence or absence of a frame mark for each frame on said medium;
d. electronic memory means having a separate memory location corresponding to each frame on said medium;
e. control means for retrievably storing in said memory means a first data value if a corresponding frame is imaged, and a second data value if its corresponding frame is unimaged.

2. Apparatus according to claim 1 wherein said scanning means provides continuous binary state outputs during a scanning operation, one of said binary states indicating a frame mark was detected.

3. Apparatus according to claim 2 wherein said moving means includes a stepper motor that causes movement of the medium in discrete steps, said control means storing said data values during each step of said stepper motor within a virtual scanning window of said scanning means.

4. Apparatus according to claim 3 wherein all frames on the updatable electrophotographic medium are arranged in rows and columns, and said apparatus further comprises second memory means for storing data defining said virtual scanning window in terms of selected stepper motor steps for each row of frames and being further defined as a total number of steps that the medium travels whereby said sensor means optically scans for said identifying frame marks.

5. Apparatus according to claim 4 wherein said virtual scanning window data comprises a plurality of calibrated physical windows, each of said physical windows being a calibrated distance in terms of said stepper motor steps for one row of frames and being further defined as a total number of steps that the medium travels.

6. Apparatus according to claim 5 wherein said control means retrievably stores said scanning means outputs during the steps defined by each of said physical windows, whereby said physical windows act as an electronic data mask for the corresponding scanning means.

7. Apparatus according to claim 2 wherein the scanning means includes at least one scanner for each column of frames and further comprising electronic mask means for retrievably storing calibration data that represents a physical window corresponding to each scanner, each physical window defining a calibrated portion of a frame row and being of sufficient size to include a portion of said frame mark for an imaged frame, each of said physical windows being derived from relative position data between its respective scanner and a calibration frame mark, said mask means determining, in cooperation with said control means, which scanning means data outputs are stored by said control means according to the position of the medium with respect to said scanning means.

8. Apparatus according to claim 3 wherein the scanning means includes at least one scanner for each column of frames and further comprising second memory means for accumulating a total number of samples of said first data value for each of said scanners, said second memory means having a unique memory location for each of said at least one scanners, said control means inputting data to said second memory means only when the virtual window corresponding to each of said scanners indicates data values should be sampled.

9. Apparatus according to claim 8 further comprising means for analyzing data values stored in said second memory means after each row of frames on the medium is scanned, said analyzing means determines whether any of said scanners detected an imaged frame based on a calibrated average sensitivity of said scanners and a total number of said samples as follows:

$$\frac{\text{Samples} \times \text{Average Sensitivity}}{\text{Physical Window}} \times \frac{1}{\text{Factor}}$$

10. In combination with a microfiche imaging system which electrophotographically produces latent electrostatic images on a microfiche within discrete imaging frame areas arranged in rows and columns and producing a frame mark for each imaged area, an apparatus for determining which frame areas are imaged, comprising:

a. means for optically scanning the frame areas and detecting a portion of a frame mark, there being a scanning means for each frame column on a microfiche, said scanning means producing electrical output data that indicates a frame mark was detected;
b. electronic memory means for storing said scanning means output data; and
c. control means for selectively sampling and retrievably storing said scanning means output data and for storing the sampled data in said memory means, there being a unique memory location that corresponds to each of the frame areas, whereby double exposure of a frame area is prevented and non-sequential imaging may be facilitated by use of the output data stored in said memory means.

11. Apparatus according to claim 10 further comprising electronic data mask means for retrievably storing data which represents a calibrated physical window corresponding to each of said scanning means, said physical window being derived from relative position data between said corresponding scanning means and a calibration frame mark, each of said physical windows defining an area where a frame mark is expected to occur for an imaged frame, said control means selectively sampling the scanning means output data according to said corresponding physical window data.

12. Apparatus according to claim 11 wherein said calibrated physical window data is derived from said scanning means output data stored after scanning a microfiche imaged by the microfiche imaging system.

13. A method for electronically mapping imaged and unimaged frames on an updatable microfiche, all frames being discrete and arranged in substantially parallel rows and columns, each imaged frame having a predetermined and detectable frame mark, comprising the steps of:

A. optically scanning each column with a frame mark detector, comprising the steps of:

(i) imparting relative movement between the microfiche and the frame mark detectors;

(ii) scanning the rows of frames;

(iii) storing in a mask memory a calibrated physical window for each frame mark detector during which the detector data is expected to be valid;

(iv) for each row of frames, sampling and storing in a second memory location imaged frame data for each frame mark detector within the physical window of the frame mark detector; and (v) analyzing the data stored in the second memory after each row of frames is scanned and determining which frame mark detectors detected a frame mark within its physical window;

B. generating electrical output data that indicates whether an imaged or an unimaged frame was detected; and C. retrievably storing the output data for each frame in a corresponding electronic memory location.

14. A method for electronically mapping a non-sequentially imaged microfiche having a plurality of imaging frames arranged in rows and columns, each imaged frame having a detectable frame mark therein, comprising the steps of:

a. optically scanning each row of frames sequentially in discrete steps with a light-sensitive sensor by using a separate sensor for each column of imaging frames;

b. generating an electrical data output signal from each sensor which indicates whether a portion of a frame mark was detected;

c. applying an electronic data mask during each row scan to said sensor output signals to selectively sample said sensor outputs for calibrated portions of said imaging frames;

d. retrievably accumulating masked data output values in an electronic memory array;

e. comparing the masked data accumulated for each sensor, after a row scan, with a calibrated sensitivity level to determine which sensors have detected a valid frame mark; and f. storing a frame map resulting from the comparing step in a second memory array.

15. The method for frame mapping a microfiche according to claim 14 further comprising the steps of:

first creating a position dependent electronic data mask stored in a third memory array by:

scanning an area of a calibration microfiche having a row of frame marks with at least one frame mark per column so that each sensor completely scans its corresponding frame mark;

storing a sample of output data from each sensor in a corresponding location in said third memory array during each scan step;

calculating a calibrated mean position of each the respect to the corresponding microfiche frame mark in terms of step numbers from a predetermined reference point;

replacing the output data samples in said third memory array with data that represents a physical scanning window of each sensor for one row of frames based on the calibrated mean position of each sensor.

16. An apparatus for electronically mapping a non-sequentially imaged microfiche having a plurality of imaging frames arranged in rows and columns, each imaged frame having a detectable frame mark therein, comprising:

a. means for optically scanning each row of frames sequentially in discrete steps with a light sensitive sensor by using a separate sensor for each column of imaging frames;

b. means for generating an electrical data output signal from each sensor which indicates whether a portion of a frame mark was detected;

c. means for applying an electronic data mask during each row scan to said sensor output signals to selectively sample said sensor outputs for calibrated portions of said imaging frames;

d. means for retrievably accumulating masked data output values in an electronic memory array;

e. means for comparing the masked data accumulated for each sensor, after a row scan, with a calibrated sensitivity level to determine which sensors have detected a valid frame mark; and f. means for storing a frame map resulting from the comparing step in a second memory array.

17. A method for electronically mapping imaged and unimaged frames on an updatable microfiche, all frames being discrete and arranged in substantially parallel rows and columns, each imaged frame having a predetermined and detectable frame mark, comprising the steps of:

A. optically scanning each column with a frame mark detector, comprising the steps of:

(i) imparting relative movement between the microfiche and the frame mark detectors in discrete steps;

(ii) scanning the rows of frames sequentially;

(iii) storing in a mask memory a calibrated physical window for each frame mark detector during which the frame mark detector data is expected to be valid, based on a relative position of the frame mark detector with respect to calibrated frame marks;

(iv) for each row of frames, sampling and storing in a second memory location imaged frame data for each frame mark detector during each discrete step of movement within the physical window of the frame mark detector; and (v) analyzing the data stored in the second memory after each row of frames is scanned and determining which frame mark detectors detected a frame mark within its physical window;

B. generating electrical output data that indicates whether an imaged or an unimaged frame was detected; and C. retrievably storing the output data for each frame in a corresponding electronic memory location.

* * * * *

UNITED STATES PATENT AND TRADEMARK OFFICE
CERTIFICATE OF CORRECTION

PATENT NO. : 4,955,032

DATED : September 4, 1990

INVENTOR(S) : J. Edward Potzler, et al

It is certified that error appears in the above-identified patent and that said Letters Patent is hereby corrected as shown below:

Column 25, claim 15, line 60, delete "the" (first occurrence) insert --sensor with--.

Signed and Sealed this

Thirty-first Day of December, 1991

*Attest:*

HARRY F. MANBECK, JR.

*Attesting Officer*

*Commissioner of Patents and Trademarks*